United States Patent

Ohnishi et al.

[11] Patent Number: 5,824,722
[45] Date of Patent: Oct. 20, 1998

[54] STABILIZER AND RESIN COMPOSITION CONTAINING THE SAME

[75] Inventors: Akiyoshi Ohnishi; Machiko Mekada, both of Mie; Noriaki Hata; Hiroyuki Suzuki, both of Ibaraki; Hiroyuki Morikawa, Hyogo, all of Japan

[73] Assignees: Mitsubishi Chemical Corporation, Tokyo; Harima Chemicals, Inc., Hyogo, both of Japan

[21] Appl. No.: 807,770

[22] Filed: Feb. 27, 1997

[30] Foreign Application Priority Data

Feb. 27, 1996 [JP] Japan ................................. 8-039925
Feb. 27, 1996 [JP] Japan ................................. 8-039926

[51] Int. Cl.$^6$ ........................... C08K 5/34; C07D 409/00; C09K 15/22
[52] U.S. Cl. ........................... 524/99; 524/102; 252/403; 546/213; 546/227
[58] Field of Search ............................. 252/403; 524/99, 524/102; 546/213, 227

[56] References Cited

FOREIGN PATENT DOCUMENTS

| | | |
|---|---|---|
| 0 407 113 A1 | 1/1991 | European Pat. Off. . |
| 0 636 610 A1 | 2/1995 | European Pat. Off. . |
| 0 641 822 A1 | 3/1995 | European Pat. Off. . |
| 44 26 222 A1 | 3/1995 | Germany . |

*Primary Examiner*—Kriellion S. Morgan
*Attorney, Agent, or Firm*—Oblon, Spivak, McClelland, Maier & Neustadt, P.C.

[57] ABSTRACT

The present invention provides a stabilizer comprising a substituted cyclohexene compound of a hindered piperidine type wherein the 1- and 2-positions on a cyclohexene ring are doubly bonded, a carbon atom situated at the 4-position and/or the 5-position of the cyclohexene ring contains a substituent having a C=O group at its alpha-position, at least one carbon atom of the cyclohexene ring located adjacent to said carbon atom having the C=O group has a hydrogen atom as a substituent, and at least one group containing a 2,2,6,6-tetramethyl-4-piperidyl group attached to the 3-, 4-, 5- or 6-position of the cyclohexene ring; and/or other substituted cyclohexene compound of a hindered piperidine and/or a compound of a hindered piperidine. The stabilizers of the present invention can exhibit improved properties in light stability and in bleed out resistance even without a phenol type antioxidant.

17 Claims, No Drawings

STABILIZER AND RESIN COMPOSITION CONTAINING THE SAME

BACKGROUND OF THE INVENTION

This invention relates to a novel stabilizer and a stabilized resin composition and in particular to a stabilizer which can provide a resin composition that is highly stable to light and less susceptible to yellowing and to bleedout of stabilizer and hence is suitably useful for various types of molding materials.

Thermoplastic resins typified by polyolefin resins, thermosetting resins, photosetting resins and the like have been molded into a wide variety of moldings for application in many industrial sectors.

However, the above resins when used individually tend to be relatively readily subject to involve oxidative deterioration, during molding or application, that is attributed to the action of heat and light in the presence of oxygen. These resins, therefore, cause cracking, yellowing and other defects, thus inviting a remarkable decline in physical performance so that they become unsuited for practical use.

To prevent this sort of oxidative deterioration by heat, various antioxidants have heretofore been developed which are of a phenol class, of a sulfur class and of a phosphorus class. In addition, ultraviolet absorbers and light stabilizers such as of a benzophenone type, a benzotriazole type, a hindered piperidine type and the like have been developed to obviate deterioration by light. The additives noted here are incorporated at production or molding stages of the foregoing molding materials.

Of those additives, a phenol type antioxidant such as 2,6-di-t-butyl-4-methylphenol, tetrakis[methylene-3-(3,5-di-t-butyl-4-hydroxyphenyl)propionate]methane or the like has been widely used since it can protect a polyolefin resin from oxidatively deteriorating during molding of the resin or during practical use of the finished molding. Despite its good protection against oxidative deterioration, the phenol type antioxidant has a serious problem in that it deteriorates oxidatively by itself and leaves a yellow color-developing substance, eventually resulting in adversely colored and aesthetically impaired molding.

As for good stabilizers for preventing oxidative deterioration by light, a certain compound is commonly known (as disclosed in Japanese Examined Patent Publication No. 46-42618) and has been practically used as an excellent light stabilizer for use in polyolefin resins. This compound contains a 2,2,6,6-tetraalkyl piperidine ring as represented by Formula (VI) below.

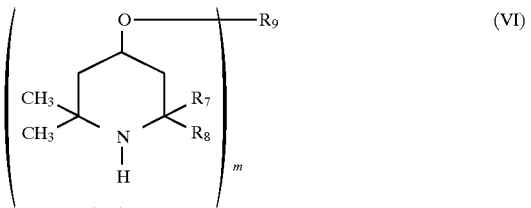

In Formula (VI), $R_7$ and $R_8$ are each an alkyl group of 1 to 4 in carbon number, $R_9$ is an acyl, diacyl or triacyl group derived from an aliphatic, alicyclic or heterocyclic mono-, di- or tricarboxylic acid, and m is an integer from 1 to 3.

More specifically, esters are in common use which are derivable by reaction of a dicarboxylic acid such as sebacic acid or malonic acid with 2,2,6,6-tetramethyl-4-piperidinol. In particular, bis(2,2,6,6-tetramethyl4-piperidyl)sebacate among these esters is commercially available and has been in wide use.

However, such a light stabilizer of a hindered piperidine type when added to a resin is liable to bleed out of a surface of the resultant molding immediately after the resin is molded, or while the molding is practically used. This is of great disadvantage, from the practical point of view, in that the molding is rendered less sightly in appearance and especially less adaptable for coating.

In coping with the problems of the prior art, hindered piperidine compounds of an oligomeric type have heretofore been used. For instance, poly[{6-(1,1,3,3-tetramethylbutyl)imino-1, 3,5-triazine-2,4-diyl}{(2,2,6,6-tetramethyl-4-piperidyl)imino}hexamethylene{(2,2,6,6-tetramethyl-4-piperidyl)imino}] and the like are widely employed which are disclosed in Japanese Laid-Open Patent Publication No. 52-71486.

In the case where the hindered piperidine of an oligomeric type is incorporated as a light stabilizer in a resin, the least bleedout is attained but with a considerably large decline in light stabilization taken as an originally intended characteristic. This is presumably due to the fact that since the light stabilizer having relatively higher molecular weight is prevented from migration in a polyolefin resin in particular, bleedout is reduced and that, at the same time, the effect-developing sites of such light stabilizer are made inaccessible to those molecular chain sites of the polyolefin resin where light stabilization is required.

Because of its failure to escape deterioration particularly during molding of a resin at a high temperature, the hindered piperidine compound is usually used in combination with a phenol type antioxidant. As discussed hereinbefore, however, the phenol type antioxidant causes undesirable coloration of the finished molding and also invites a decrease in its inherent light stabilization which arises from to light sensitization of a denatured substance of the phenol.

Accordingly, a demand has been voiced for a stabilizer that is highly stable to light with yellowing and bleedout held to an absolute minimum. A principal object of the present invention is to provide a new stabilizer and a stabilized resin composition which excels not only in light stability but also in resistance to discoloration and to bleedout.

BRIEF SUMMARY OF THE INVENTION

To eliminate the aforementioned problems, the present inventors have carried out intensive research on the chemical and physical properties of polymer molecules, antioxidants and light stabilizers and interactions therebetween, and have now found that a hindered piperidine compound of a specific structure is highly soluble in polymers and hence capable of exhibiting excellent bleedout resistance and great light stabilization peculiar to the hindered piperidine structure, and which is further sufficient to protect the corresponding resin from oxidative deterioration at high temperature during molding even without the need to combine it with a phenol type antioxidant. Namely, it has been found that a resin composition comprised of a specified hindered piperidine compound is sufficiently resistant to oxidative deterioration at elevated temperatures during molding even when no phenol type antioxidant is formulated so that the resultant molding is free from coloration as no phenol type antioxidant is present therein. It is also free from bleedout during practical application, which is coupled with high stability to light. The present invention has been completed based upon the above findings.

More specifically, the present invention provides a stabilizer comprising at least one member selected from the group consisting of compound 1, compound 2 and compound 3, each of which is defined below:

compound 1: a substituted cyclohexene compound of a hindered piperidine type wherein the 1- and 2-positions on a cyclohexene ring are doubly bonded, a carbon atom situated at the 4-position and/or the 5-position of the cyclohexene ring contains a substituent having a C=O group at its alpha-position, at least one carbon atom of the cyclohexene ring located adjacent to said carbon atom having the C=O group has a hydrogen atom as a substituent, and at least one group containing a 2,2,6,6-tetramethyl-4-piperidyl group which may be substituted at its 1-position is attached to the 3-, 4-, 5- or 6-position of the cyclohexene ring;

compound 2: a substituted cyclohexane compound of a hindered piperidine type represented by Formula (I)

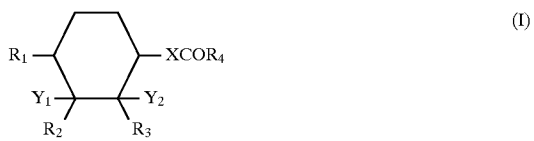

(I)

where $R_1$ is a hydrocarbon group, X is a divalent hydrocarbon group, $Y_1$ and $Y_2$ are each a hydrogen atom or a $COR_4$ group, $R_2$ and $R_3$ are each a hydrogen atom or a hydrocarbon group, wherein $R_4$ is represented by Formula (II)

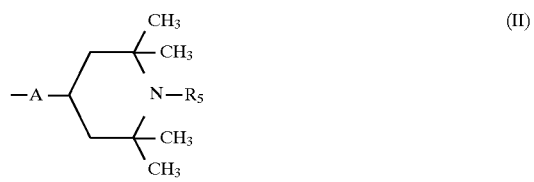

(II)

where A is —O— or —$NR_6$— wherein $R_6$ is a hydrogen atom, or an alkyl or acyl group of 1 to 5 in carbon number, $R_5$ is a hydrogen atom, or an alkyl or acyl group of 1 to 5 in carbon number, $R_2$ and $R_3$ are each a hydrogen atom when $Y_1$ and $Y_2$ are each a $COR_4$ group, $R_2$ is a hydrogen atom when $Y_1$ is a $COR_4$ group, $R_3$ is a hydrogen atom when $Y_2$ is a $COR_4$ group, and at least one of $Y_1$ and $Y_2$ is a $COR_4$ group; and compound 3: a compound of a hindered piperidine type represented by Formula (III)

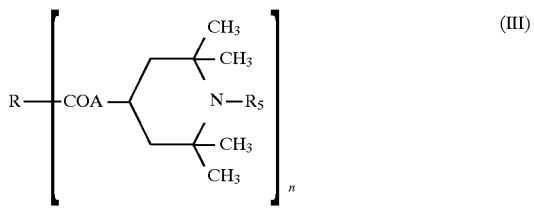

(III)

where R is a moiety of a dimer, trimer or tetramer of unsaturated fatty acids of 16 to 22 in carbon number, or a moiety of a hydrogenated product thereof, n is an integer from 2 to 4, A is —O— or —$NR_6$— wherein $R_6$ is a hydrogen atom, or an alkyl or acyl group of 1 to 5 in carbon number, and $R_5$ is a hydrogen atom, or an alkyl or acyl group of 1 to 5 in carbon number.

The invention further provides a stabilized resin composition comprising 100 parts by weight of a starting resin and 0.01 to 1 part by weight of the above defined stabilizer.

Hindered piperidine compounds eligible for the present invention, unlike conventional equivalents, are effective for avoiding deterioration at elevated temperature during molding of a resin with no need for the combination with a phenol type antioxidant.

The stabilizer according to the present invention is sufficiently protected from deterioration during molding of a resin even when it is not formulated with the phenol type antioxidants that are indispensable in conventional practice. Thus, those protective effects induced inherently present in the hindered piperidine structure are fully achievable in regards to oxidative deterioration by light or by heating of the resultant molding material while the latter is being used.

Moreover, since no phenol type antioxidant is added colorable substance can be prevented from forming in the resultant molding material. Further, reduction in light stability caused from light sensitization from some denatured substances may also be prevented.

In addition and advantageously, the hindered piperidine compound useful in this invention contains in its structure long fatty chains and hence dissolves well in polymers, with little bleedout to retain high light stability.

According to the present invention, excellent resistance to oxidative deterioration, sufficient stability to light and high resistance to discoloration and to bleedout can be imparted to a resin by addition, as a stabilizer, of the above specified hindered piperidine compound to the resin.

DETAILED DESCRIPTION OF THE PREFERRED EMBODIMENT

The present invention will now be described below in greater detail.

(Stabilizers)

The stabilizers of the invention are hindered piperidine compounds selected from the group consisting of compound 1, compound 2 and compound 3.

(Hindered Piperidine Compound 1)

A hindered piperidine compound useful as compound 1 above in the invention is a substituted cyclohexene compound of a hindered piperidine type wherein the 1- and 2-positions on a cyclohexene ring are doubly bonded, a carbon atom situated at the 4-position and/or the 5-position of the cyclohexene ring contains a substituent having a C=O group at its alpha-position, at least one carbon atom of the cyclohexene ring located adjacent to said carbon atom having the C=O group has a hydrogen atom as a substituent, and at least one group containing a 2,2,6,6-tetramethyl-4-piperidyl group which may be substituted at its 1-position is attached to the 3-, 4-, 5- or 6-position of the cyclohexene ring. It is preferred that a hydrogen atom be attached as another substituent to the carbon atom located on the cyclohexene ring and provided with a substituent containing the above C=O group.

A hindered piperidine compound suitable for use as compound 1 in the invention is a substituted cyclohexene compound represented by Formula (IV) below.

(IV)

In Formula (IV), $R_1$ is a hydrocarbon group, for example, a hydrocarbon group of 1 to 20 in carbon number, X is a divalent hydrocarbon group, for example, a divalent hydrocarbon group of 1 to 20 in carbon number, $Y_1$ and $Y_2$ are each a hydrogen atom or a $COR_4$ group, $R_2$ and $R_3$ are each a hydrogen atom or a hydrocarbon group, for example, a hydrocarbon group of 1 to 10 in carbon number, wherein $R_4$ is represented by Formula (V) below.

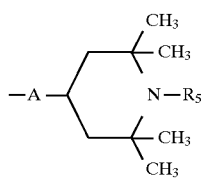
(V)

In Formula (V), A is —O— or —$NR_6$— wherein $R_6$ is a hydrogen atom, or an alkyl or acyl group of 1 to 5 in carbon number, and $R_5$ is a hydrogen atom, or an alkyl or acyl group of 1 to 5 in carbon number, preferably a hydrogen atom or a methyl group, $R_2$ and $R_3$ are each a hydrogen atom when $Y_1$ and $Y_2$ are each a $COR_4$ group, $R_2$ is a hydrogen atom when $Y_1$ is a $COR_4$ group, $R_3$ is a hydrogen atom when $Y_2$ is a $COR_4$ group, and at least one of $Y_1$ and $Y_2$ is a $COR_4$ group.

A hindered piperidine compound more suitable as compound 1 for the invention is a substituted cyclohexene compound represented by Formula (IV') below.

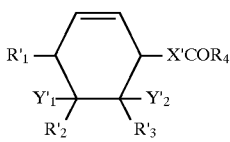
(IV')

In Formula (IV'), $R'_1$ is an alkyl or alkenyl group of 1 to 16 in carbon number, X' is an alkylene or alkenylene group of 1 to 16 in carbon number, $Y'_1$ and $Y'_2$ are each a hydrogen atom or a $COR_4$ group wherein at least one of $Y'_1$ and $Y'_2$ is a $COR_4$ group, and $R'_2$ and $R'_3$ are each a hydrogen atom, or an alkyl group of 1 to 5 in carbon number, an alkenyl group of 2 to 5 in carbon number or an aryl group of 6 to 8 in carbon number, wherein $R_4$ is represented by Formula (V) below.

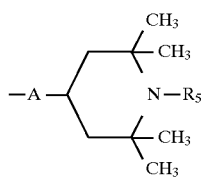
(V)

In Formula (V), A is —O— or —$NR_6$— wherein $R_6$ is a hydrogen atom, or an alkyl or acyl group of 1 to 5 in carbon atom, and $R_5$ is a hydrogen atom, or an alkyl or acyl group of 1 to 5 in carbon number, preferably a hydrogen atom or a methyl group.

This hindered piperidine compound may preferably be one that is derivable from a dibasic or tribasic acid that is an adduct of an unsaturated fatty acid and an unsaturated carboxylic acid. Details of these acids will be described later.

Preparation Method

The hindered piperidine type compound for use as compound 1, may be produced by esterifying a starting material, a dibasic or tribasic acid of Formula (VII) below that has been derived as an adduct of an unsaturated fatty acid and an unsaturated carboxylic acid, thereby preparing for example an alkyl ester such as of methyl, ethyl or the like, and subsequently by reacting the resultant ester with a hindered piperidine compound of Formula (VIII) or (IX) below.

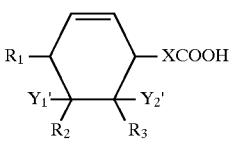
(VII)

In Formula (VII), $R_1$ is an alkyl or alkenyl group of 1 to 20 in carbon number, preferably of 1 to 16 in carbon number, X is an alkylene or alkenylene group of 1 to 20 in carbon number, preferably of 1 to 16 in carbon number, and $Y'_1$ and $Y'_2$ are each a hydrogen atom or a COOH group wherein at least one of $Y'_1$ and $Y'_2$ is a COOH group. Also in this formula, $R_2$ and $R_3$ are each a hydrogen atom, or an alkyl group of 1 to 10 in carbon number, preferably of 1 to 5 in carbon number, an alkenyl group of 2 to 10 in carbon number, preferably of 2 to 5 in carbon number or an aryl group of 6 to 10 in carbon number, preferably of 6 to 8 in carbon number.

In general, the dibasic or tribasic acid of Formula (VII) may be synthetically obtained with use of fatty acids, of vegetable fats and oils such as corn oil, cotton seed oil, soybean oil, olive oil, colza oil, safflower oil, castor oil, tall oil and the like, animal fats and oils such as tallow, lard, chicken oil and the like, fish oils such as cod oil, cuttlefish oil, sardine oil, mackerel oil, tuna oil and the like, linolic acid, preferably in pure form, such as linoleic acid, gamma-linolenic acid, arachidonic acid and the like. These natural fatty acids are composed mainly of palmitic acid, stearic acid, oleic acid, linoleic acid, linolenic acid, gamma-linolenic acid, arachidonic acid, EPA and DHA, but the components listed here should be considered to be illustrative and not restrictive. A mixture of said natural fatty acids also can be used as the material of the compound. A selected fatty acid is conjugated in a known manner, followed by addition to the resulting conjugate of an unsaturated carboxylic acid such as acrylic acid, methacrylic acid, maleic acid, fumaric acid, crotonic acid, cinnamic acid, sorbic acid, itaconic acid, mesaconic acid, citraconic acid or the like, or an anhydride thereof by means of the Diels-Alder reaction, whereby a dibasic or tribasic acid is obtained. Further purification of the reaction mixture through a known mode of distillation, chromatography or other means provides a dibasic or tribasic acid of high purity.

The dibasic or tribasic acid thus obtained is converted in conventional manner into an alkyl or like ester such as of methyl, ethyl or the like which is thereafter subjected to the following treatment together with an alcohol product represented by Formula (VIII) below or an amine product represented by Formula (IX) below.

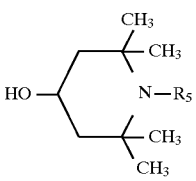
(VIII)

In Formula (VIII), $R_5$ is a hydrogen atom, or an alkyl or acyl group.

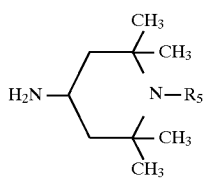

(IX)

In Formula (IX), $R_5$ is a hydrogen atom, or an alkyl or acyl group.

The ester prepared above is heated in admixture with the above alocohol or amine product at 0° to 300° C., preferably at 120° to 250° C., without use of or with use of an organic solvent such as n-hexane, isooctane, toluene, xylene, tetrahydrofuran, dioxane, dimethylformamide or the like and in the presence of a catalyst such as lithium hydroxide, sodium hydroxide or potassium hydroxide, or an alkoxide made up of lithium, sodium, potassium or like metal and methanol, ethanol, isopropanol, t-butanol or like alcohol. Thus, an esterified or amidated product of a hindered piperidine type is provided as desired compound 1 from the dibasic or tribasic acid.

Moreover, a compound of Formula (IV) or (IV') wherein $R_5$ is denoted by an alkyl or acyl group, can be produced from the corresponding N—H compound by substitution reaction of a secondary amine as is commonly known in the art, for example, with use of an alkyl halide, an acid halide or an acid anhydride.

A compound of Formula (IV) or (IV') wherein $R_5$ is designated by a methyl group, can further be produced by reaction of the corresponding N—H compound with formic acid and formalin.

(Hindered Piperidine Compound 2)

The hindered piperidine compound for use as compound 2 above in the present invention is a substituted cyclohexane compound of a hindered piperidine type represented by Formula (I) below.

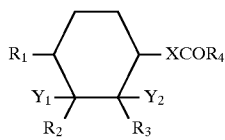

(I)

In Formula (I), $R_1$ is a hydrocarbon group, for example, a hydrocarbon group of 1 to 20 in carbon number, X is a divalent hydrocarbon group, for example, a divalent hydrocarbon group of 1 to 20 in carbon number, $Y_1$ and $Y_2$ are each a hydrogen atom or a $COR_4$ group, $R_2$ and $R_3$ are each a hydrogen atom or a hydrocarbon group, for example, a hydrocarbon group of 1 to 10 in carbon number, wherein $R_4$ is represented by Formula (II) below.

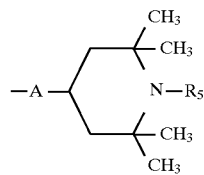

(II)

In Formula (II), A is —O— or —$NR_6$— wherein $R_6$ is a hydrogen atom, or an alkyl or acyl group of 1 to 5 in carbon number, $R_5$ is a hydrogen atom, or an alkyl or acyl group of 1 to 5 in carbon number, preferably a hydrogen atom or a methyl, $R_2$ and $R_3$ are each a hydrogen atom when $Y_1$ and $Y_2$ are each a $COR_4$ group, $R_2$ is a hydrogen atom when $Y_1$ is a $COR_4$ group, $R_3$ is a hydrogen atom when $Y_2$ is a $COR_4$ group, and at least one of $Y_1$ and $Y_2$ is a $COR_4$ group.

Hindered piperidine compound suitable for use in the present invention is a substituted cyclohexane compound represented by Formula (I') below.

(I')

In Formula (I'), $R'_1$ is an alkyl or alkenyl group of 1 to 16 in carbon number, X' is an alkylene or alkenylene group of 1 to 16 in carbon number, $Y'_1$ and $Y'_2$ are each a hydrogen atom or a $COR_4$ group wherein at least one of $Y'_1$ and $Y'_2$ is a $COR_4$ group, and $R'_2$ and $R'_3$ are each a hydrogen atom, or an alkyl group of 1 to 5 in carbon number, an alkenyl group of 2 to 5 in carbon number or an aryl group of 6 to 8 in carbon number, wherein $R_4$ is represented by Formula (II) below.

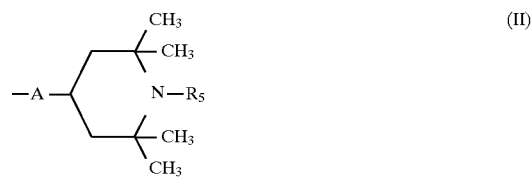

(II)

In Formula (II), A is —O— or —$NR_6$— wherein $R_6$ is a hydrogen atom, or an alkyl or acyl group of 1 to 5 in carbon number, preferably a hydrogen atom or a methyl group, and $R_5$ is a hydrogen atom, or an alkyl or acyl group of 1 to 5 in carbon number.

In regard to this hindered piperidine compound, a hydrogenated compound is preferred which can be obtained by hydrogenating, in the form of a saturated six-membered ring, a hindered piperidine type compound resulting from a dibasic or tribasic acid and having unsaturated bonds in its six-membered ring. The dibasic or tribasic acid is derived as an adduct of an unsaturated fatty acid and an unsaturated carboxylic acid as will be described later.

Preparation Method

The aforementioned hindered piperidine type compound for use as compound 2 can be produced for example by converting, into an alkyl or like ester such as of methyl, ethyl or the like, a dibasic or tribasic acid of Formula (VII) that is derived as an adduct of an unsaturated fatty acid and an unsaturated carboxylic acid, followed by reaction of such ester with a hindered piperidine compound of Formula (VIII) or (IX). Alternatively, the hindered piperidine type compound may be produced by converting, into the form of an alkyl or like ester such as of methyl, ethyl or the like, a dibasic or tribasic acid represented by Formula (VII) and having unsaturated bonds in its six-membered ring, by hydrogenating such unsaturated bonds in a conventional manner, and subsequently by reacting the resultant hydrogenated product with a hindered piperidine compound of Formula (VIII) or (IX).

In addition to those preparation methods, the hindered piperidine type compound may also be produced by converting a dibasic or tribasic acid of Formula (VII) into an alkyl or like ester such as of methyl, ethyl or the like, by reacting the resultant ester with a hindered piperidine compound of Formula (VIII) or (IX) to thereby prepare a substituted cyclohexene compound of a hindered piperidine type, and subsequently by hydrogenating the same.

The above methods of hydrogenation are not particularly restricted, and any known methods may be utilized. For instance, one suitable known method involves a reaction employing a salt or a complex, as a catalyst, such as of nickel, copper, palladium, rhodium, ruthenium, platinum or the like generally for use in catalytic reduction reaction. Thus, hydrogenation may be conducted for example in the presence of a catalyst composed of 1 to 10% of palladium carried on activated carbon and without use of or with use of an organic solvent chosen from toluene, xylene, ethylbenzene, mesitylene, methanol, ethanol, isopropanol, n-butanol, tetrahydrofuran, n-hexane, n-heptane, isooctane, ethyl acetate and the like and in a temperature range of 0° to 300° C., preferably of 120° to 250° C.

The synthesis methods of the substituted cyclohexane compound of a hindered piperidine type for use as compound 2 are as described hereinabove. More specifically but for illustrative purposes, the dibasic or tribasic acid and the hydrogenated product obtained above may be converted, in a known manner, into an alkyl or like ester such as of methyl, ethyl or the like, followed by heating of the resulting ester together with an alcohol product of Formula (VII) or an amine product of Formula (IX) without use of or with use of an organic solvent such as n-hexane, isooctane, toluene, xylene, tetrahydrofuran, dioxane, dimethylformamide or the like and in the presence of a catalyst such as lithium hydroxide, sodium hydroxide or potassium hydroxide, or an alkoxide made up of a metal such as lithium, sodium, potassium or the like and an alcohol such as methanol, ethanol, isopropanol, t-butanol or the like and at 0° to 300° C., preferably at 120° to 250° C. Thus, an esterified or amidated product of a saturated cyclohexane compound of a hindered piperidine type is obtained as compound 2 as desired.

A compound of Formula (I) or (I') where $R_5$ is denoted by an alkyl or acyl group can be produced from the corresponding N—H compound by means of conventional substitution reaction of a secondary amine for example with use of an alkyl halide, an acid halide or an acid anhydride.

A compound of Formula (I) or (I') where $R_5$ is denoted by a methyl group can be produced by conventional N-methylation reaction in which the corresponding N—H compound is reacted with formic acid and formalin.

(Hindered Piperidine Compound 3)

In a hindered piperidine type compound of Formula (III) above for use as compound 3 in this invention, R is a moiety of a cyclic or acyclic dimer, trimer or tetramer of unsaturated fatty acids having 16 to 22 carbon atoms, or a moiety of hydrogenated products thereof. Namely, this moiety refers to that of an aliphatic divalent, trivalent or tetravalent carboxylic acid. In the practice of the present invention, n=2 is preferred which means that R is a moiety of a dimer of unsaturated fatty acids or a hydrogenated product thereof.

Specific structural details of R may be of an acyclic structure indicated for example by Formula (X) below, or of a cyclic structure indicated for example by Formulae (XI) and (XII) below.

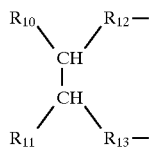  (X)

In Formula (X), $R_{10}$ and $R_{11}$ are each a hydrogen atom, or an alkyl or alkenyl group having a carbon number of not larger than 19, and $R_{12}$ and $R_{13}$ are each an alkylene or alkenylene group having a carbon number of not larger than 20, wherein the total carbon number of $R_{10}$ and $R_{12}$ is in the range of 14 to 20, and the total carbon number of $R_{11}$ and $R_{13}$ is in the range of 14 to 20.

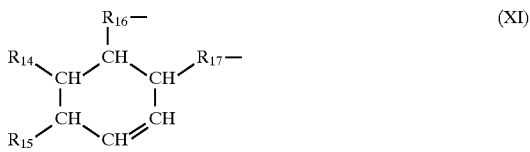  (XI)

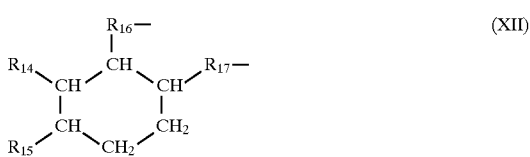  (XII)

In Formulae (XI) and (XII), $R_{14}$ is a hydrogen atom, or an alkyl or alkenyl group of not more than 18 in carbon number, $R_{15}$ is a hydrogen atom, or an alkyl or alkenyl group of not more than 16 in carbon number, $R_{16}$ is an alkylene or alkenylene group of not more than 19 in carbon number, and $R_{17}$ is an alkylene or alkenylene group of not more than 17 in carbon number, wherein the total carbon number of $R_{14}$ and $R_{16}$ is in the range of 13 to 19, and the total carbon number of $R_{15}$ and $R_{17}$ is in the range of 11 to 17.

A polymer of unsaturated fatty acids resulting synthetically from a naturally occurring fatty acid, a hydrogenated product thereof and a hindered piperidine compound thereof are in many instances obtained in the form of a mixture of acyclic and cyclic structures so long as they are not purified and fractionated.

Preparation Method

The hindered piperidine type compound for use as compound 3 can be produced by converting, into the form of an alkyl or like ester such as of methyl, ethyl or the like, a conventional unsaturated fatty acid or a hydrogenated product thereof, and subsequently by reacting the resulting ester with a hindered piperidine compound of Formula (VIII) or (IX).

Known polymers of unsaturated fatty acids suitable for the present invention may be made obtainable usually from polymerization of, in a conventional manner, starting materials chosen from among vegetable fats and fatty oils such as corn oil, cotton seed oil, olive oil, colza oil, safflower oil, castor oil, tall oil and the like, fish oils such as cod oil, cuttlefish oil, sardine oil, mackerel oil, tuna oil and the like, and animal fats and fatty oils such as tallow, lard, chicken oil and the like, and also purified unsaturated fatty acids of 16 to 22 carbon atoms such as linoleic acid, oleic acid and the like. These natural fatty acids contain as chief components palmitic acid, stearic acid, oleic acid, linoleic acid and linolenic acid, but such components should not be regarded as restrictive. A mixture of said natural fatty acids also can be used as the material of the compound. An unsaturated fatty acid as the starting material can be polymerized in conventional manner to thereby obtain a polymer represented by Formula (XIII) below.

$R(COOH)_n$  (XIII)

In Formula (XIII), R is a moiety left upon removal of a carboxylic group from a dimer, trimer or tetramer of unsaturated fatty acids of 16 to 22 in carbon number, and n is an integer from 2 to 4.

The unsaturated fatty acid polymer so prepared may be further distilled, chromatographed or otherwise treated in conventional fashion so that a highly pure dimer, trimer or tetramer is provided.

The unsaturated fatty acid polymer obtained above may be used as it is, or may be hydrogenated into a saturated form prior to use. The method of hydrogenation is not particularly limited, but may be carried out as is known in the art. One suitable known method is directed to a reaction employing a catalyst made up of a salt or a complex such as of copper, palladium, rhodium, rhtenium, platinum or the like generally for use in catalytic reduction reaction. Such a hydrogenation reaction may be effected, for example, in the presence of a catalyst having 1 to 10% of palladium supported on activated carbon and without use of or with use of an organic solvent chosen from among toluene, xylene, ethybenzene, mesitylene, methanol, ethanol, isopropanol, n-butanol, t-butanol, tetrahydrofuran, n-hexane, isooctane, ethyl acetate and the like and at a temperature of 50° to 300° C., preferably of 120° to 250° C.

A given unsaturated fatty acid polymer or a given hydrogenated product thereof prepared above may be converted into an alkyl or like ester such as of methyl, ethyl or the like, and subsequently the resulting ester may be heated together with an alcohol product of Formula (VIII) or an amine product of Formula (IX) without use of or with use of an organic solvent such as n-hexane, isooctane, toluene, xylene, tetrahydrofuran, dioxane, dimethylformamide or the like and in the presence of a catalyst such as lithium hydroxide, sodium hydroxide, potassium hydroxide or the like, or an alkoxide made up of a metal such as lithium, sodium, potassium or the like and an alcohol such as methanol, ethanol, isopropanol, t-butanol or the like and at a temperature of 0° to 300° C., preferably of 120° to 250° C. Thus, an esterified or amidated product of hindered piperidine type is obtained as compound 3 as desired.

Furthermore, a compound of Formula (III) where $R_5$ is meant by an alkyl or acyl group can be produced from the corresponding N—H compound through conventional substitution for example with use of an alkyl halide, an acid halide or an acid anhydride.

A compound of Formula (III) where $R_5$ is specified to be a methyl group can be produced by conventional N-methylation in which the corresponding N—H compound is allowed to react with formic acid and formalin.

(Resins)

Resins that may be used for the present invention are of a thermoplastic class and a thermosetting class. Thermoplastic resins include styrene type resins, olefin type resins, thermoplastic elastomers, vinyl chloride type resins, polyamides, polyesters, methacrylic resins, polycarbonates, polyacetals, poly(ethylene oxide)s, poly(phenylene ether)s, polysulfones, polyurethanes and the like, whereas thermosetting resins include unsaturated polyesters and the like. Thermoplastic resins are particularly preferable, among which olefin type resins are especially favorable.

Specific examples of styrene type resins are chosen from polystyrenes, high-impact polystyrenes, styrene-acrylonitrile copolymers, ABS resins, AES resins, ACS resins, AAS resins and the like, and combinations thereof.

Specific examples of vinyl chloride type resins are chosen from polyvinyl chlorides, vinyl chloride-vinyl acetate copolymers, vinyl chloride-olefin copolymers such as vinyl chloride-propylene copolymers and the like.

Specific examples of polyamides are chosen from nylon 4, nylon 6, nylon 4.6, nylon 6.6, nylon 6.10, nylon 7, nylon 8 and nylon 12, and combinations thereof.

Specific examples of polyesters are chosen from polyethylene terephthalates, polybutylene terephthalates and the like.

Specific examples of olefin type resins are chosen from poly-alpha-olefins such as low-density polyethylenes, straight-chain low-density polyethylenes, medium-density polyethylenes, high-density polyethylenes, polypropylenes, ethylene-propylene copolymers, polybutenes-1 ethylene-butene-1 random copolymers and the like, and poly-alpha-olefin-monomeric vinyl copolymers such as maleic anhydride-modified polypropylenes and the like, and mixtures thereof. Particularly preferred are polypropylenes and propylene type copolymers.

Suitable thermoplastic elastomers are those known in the art which are selected from polyolefin type elastomers, styrene type elastomers, polyester elastomers and the like.

The above specified resins may be incorporated where desired with antioxidants to an extent not to adversely affect those advantages contemplated under the present invention, ultraviolet absorbers, light stabilizers other than those recited in the appended claims, antistatic agents, flame retardants, lubricants, molding aids, metallic soaps, metal deactivators, nucleators, plasticizers, pigments, fillers, blowing agents and the like.

When added to the resin composition according to the invention, a phenol type antioxidant among those additives contributes greatly to enhanced protection against deterioration of the resin which might occur while the same is being molded at elevated temperature and moreover against oxidative deterioration of the resultant molding which might take place while the same is being practically used. It is to be noted that such antioxidant would conversely impair light stability and discoloration resistance.

Quantitative Proportions

In implementing the present invention, the amount of the hindered piperidine compound to be added is in the range of 0.01 to 1 part by weight, preferably of 0.01 to 0.5 part by weight, based on 100 parts by weight of a given resin. Less than 0.01 part by weight is not sufficiently effective as a light stabilizer, while more than 1 part by weight results in reduced bleedout resistance.

Formulations

For mixing a given resin and a hindered piperidine compound as well as any other necessary suitable components, melt mixing may generally be conducted with a conventional mixing apparatus such as a single-screw extruder, a twin-screw extruder, a Banbury mixer, a roll, a Brabender Plastograph, a kneader or the like in the case of thermoplastic resins. To this end, the best possible mode of mixing should preferably be selected to ensure good dispersion of the given components in the resin. In the case of thermosetting resins, a hindered piperadine compound and other necessary components are admixed with and dispersed in a given resin in advance and then put to use.

EXAMPLES

The present invention will be further described below in more detail with reference to several synthesis examples, inventive examples and comparative examples.

(Compound 1)

Synthesis Example 1

A dibasic acid synthetically obtained from addition reaction of tall oil and acrylic acid was converted into an ester which was then subjected to ester exchange reaction, whereby a hindered piperidine derivative was synthesized.

An amount of 500 g of dibasic acid resulting from addition reaction of tall oil and acrylic acid and having a carbon number of 21 (acid value: 271.0, chief ingredient: 5

(or 6)-carboxy-4-hexyl-2-cyclohexene-1-octanoic acid, purity: greater than 90%, starting fatty acid contained in an amount of less than 10%) was dissolved in 500 g of methanol in a reactor in which 10.0 g of sulfuric acid was then placed. Refluxing was conducted with heating until the acid value of the above solution was made lower than 10. After completion of the reaction, the reaction liquid was washed with water until the pH value was rendered neutral, followed by removal of the residual water and solvent by means of vacuum distillation, whereupon a methyl ester product was obtained.

An amount of 200 g of the methyl ester product was dissolved in 200 g of xylene, and 171 g of 2,2,6,6-tetramethyl-4-hydroxypiperidine and 19.2 g of 28% sodium methoxide were put into a reactor, followed by refluxing of the above solution with heating for 5 hours. On completion of the reaction, the reaction liquid was washed with water until the pH value was rendered neutral, and the residual water and solvent were then removed by vacuum distillation. Thus, a hindered piperidine compound was produced which was composed predominantly of compounds of the following structures and had a purity of 90%, a viscosity of 3,270 cps (25° C.) and a specific gravity of 0.974 (25° C).

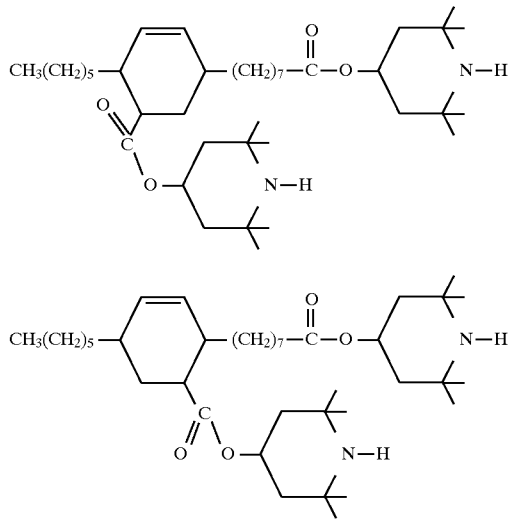

Where Me represents a methyl group.

Synthesis Example 2

A dibasic acid was synthesized from crotonic acid and linoleic acid and then converted to a methyl ester from which a hindered piperidine compound was thereafter synthesized.

An amount of 1,000.0 g (3.57 mol) of linoleic acid was put into a four-necked flask in which 22.6 g (0.18 mol) of iodine was then incorporated. To this mixture was added dropwise 368.4 g (4.28 mol) of crotonic acid in a nitrogen atmosphere at 220° C. over a length of time of 2 hours. Aging of the reaction liquid was thereafter done for 2 hours, followed by steam sparging of the aged liquid to remove the residual crotonic acid, whereby 1,167.0 g of a crude dibasic acid was obtained as a yellowish oily product. Upon cutting of low-boiling matter (0.8 torr, 160° C.), the crude product was distilled in vacuo (0.8 torr, 260° C.) so that 584.1 g of a dibasic acid was produced in the form of a pale yellowish oily product.

An amount of 500.0 g (1.36 mol) of the crotonic acid-induced dibasic acid was charged into a four-necked flask and dissolved in 500 g of methanol, and the resulting solution was incorporated with 10.0 g of sulfuric acid. Refluxing with heat was performed until the acid value of the reaction liquid became lower than 10. Upon completion of the reaction, the reaction liquid was washed repeatedly with water until the pH value was made neutral, followed by separation of an organic layer and by subsequent removal of the solvent through vacuum distillation, whereby 466.2 g of a methyl ester of a crotonic acid-induced dibasic acid was prepared as a pale yellowish oily product.

An amount of 200.0 g (0.51 mol) of the crotonic acid-induced dibasic acid methyl ester was put into a four-necked flask and dissolved in 200 g of n-heptane, and to the solution were added 175.4 g (1.12 mol) of 2,2,6,6-tetramethyl-4-hydroxypiperidine and 9.78 g (50.7 mmol) of a 28% sodium methoxide solution. The resulting mixture was refluxed with heating in a nitrogen atmosphere for 5 hours. Upon completion of the reaction, the reaction liquid was repeatedly washed with water until the pH value was made neutral, followed by separation of an organic layer and by subsequent removal of the solvent through vacuum distillation. Thus, a hindered piperidine derivative of the following structures was obtained in an amount of 237.4 g as a pale yellowish oily product.

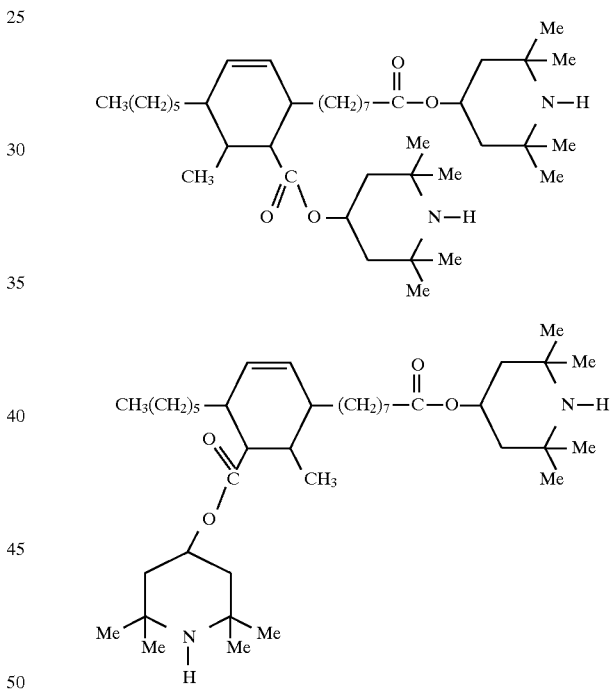

Synthesis Example 3

A dibasic acid was synthesized by use of cinnamic acid and linoleic acid and converted to a methyl ester, from which a hindered piperidine derivative was synthesized.

An amount of 1,000.0 g (3.57 mol) of linoleic acid was placed in a four-necked flask and then incorporated with 22.6 g (0.18 mol) of iodine. To the mixture was added dropwise 634.0 g (4.28 mol) of cinnamic acid in a nitrogen atmosphere over an extended period of time of 2 hours. Subsequently, aging was effected for 2 hours, followed by removal of the residual cinnamic acid by means of steam sparging, whereupon 1,484.5 g of a crude dibasic acid was prepared as a yellowish oily product.

An amount of 500.0 g (1.17 mol) of the dibasic acid induced from cinnamic acid was charged into a four-necked flask and dissolved in 500 g of methanol and thereafter incorporated with 10.0 g of sulfuric acid. The resulting solution was refluxed with heating until the acid value was made below 10. Upon completion of the reaction, water washing was done until the reaction liquid was made neutral. Subsequently, an organic layer was separated, and the residual solvent was removed by vacuum distillation, whereby 527.2 g of a crude dibasic acid methyl ester was prepared as a pale yellowish oily product. After low-boiling matter was cut twice (0.8 torr, 130° C.), such ester was distilled in vacuo (0.8 torr, 230° C.) with the result that 247.7 g of a methyl ester product was obtained as a pale yellowish oily product.

An amount of 200.0 g (0.44 mol) of the cinnamic acid-induced dibasic acid methyl ester was placed in a four-necked flask and dissolved in 200.0 g of n-heptane and then incorporated with 151.5 g (0.96 mol) of 2,2,6,6-tetramethyl-4-hydroxypiperidine and 8.45 g (43.8 mmol) of a 28% sodium methoxide solution, followed by refluxing of the resulting mixture with heating in a nitrogen atmosphere for 5 hours. Upon completion of the reaction, the reaction liquid was repeatedly washed with water until the pH value was rendered neutral. Thereafter, an organic layer was separated, and the residual solvent was removed by vacuum distillation, whereby 204.6 g of a hindered piperidine derivative of the following structures was produced as a brownish oily product.

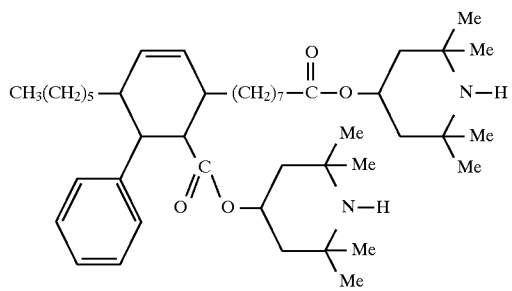

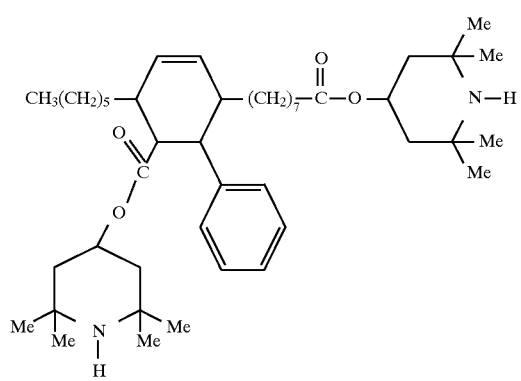

Synthesis Example 4

A dibasic acid was synthesized by use of sorbic acid and linoleic acid and converted to a methyl ester, from which a hindered piperidine derivative was synthesized.

An amount of 1000.0 g (3.57 mol) of linoleic acid was placed in a four-necked flask and incorporated with 22.6 g (0.18 mol) of iodine, and 479.8 g (4.28 mol) of sorbic acid was then added dropwise in a nitrogen atmosphere at 220° C. over a length of time of 2 hours. Subsequent aging was conducted for 2 hours, followed by removal of the residual sorbic acid by means of steam sparging, whereby 1,311.5 g of a crude dibasic acid was prepared as a yellowish oily product.

An amount of 500.0 g (1.27 mol) of the dibasic acid induced from sorbic acid was charged into a four-necked flask and dissolved in 500 g of methanol and thereafter incorporated with 10.0 g of sulfuric acid. The resultant solution was refluxed with heat until the acid value was made below 10. Upon completion of the reaction, the reaction liquid was repeatedly washed with water until a neutral pH value was reached. Subsequently, an organic layer was separated, and the residual solvent was distilled off in vacuo, whereby 472.9 g of a crude dibasic acid methyl ester was prepared as a brownish oily product. After low-boiling matter was cut twice (0.8 torr, 130° C.), the crude methyl ester was distilled in vacuo (0.8 torr, 230° C.) so that 241.7 g of a methyl ester product was obtained as a yellowish oily product.

An amount of 200.0 g (0.49 mol) of the sorbic acid-induced dibasic acid methyl ester was placed in a four-necked flask and dissolved in 200.0 g of n-heptane and then incorporated with 170.2 g (1.08 mol) of 2,2,6,6-tetramethyl-4-hydroxypiperidine and 9.49 g (49.1 mmol) of a 28% sodium methoxide solution, followed by refluxing of the resulting liquid with heating in a nitrogen atmosphere for 5 hours. Upon completion of the reaction, the reaction liquid was washed repeatedly with water until the pH value was rendered neutral. Then, an organic layer was separated, and the residual solvent was removed by vacuum distillation with the result that 208.7 g of a hindered piperidine derivative of the following structures was produced as a brownish oily product.

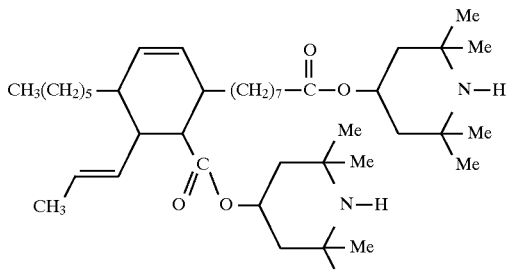

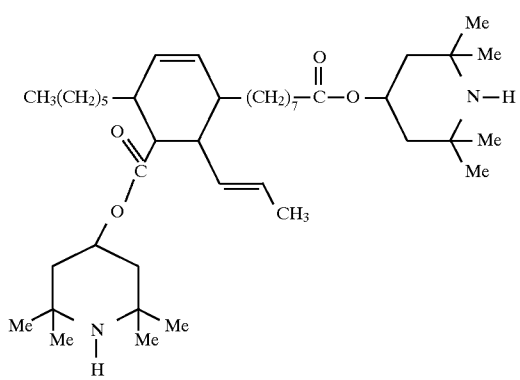

Synthesis Example 5

A tribasic acid was synthesized by use of maleic acid and linoleic acid and converted to a methyl ester, from which a hindered piperidine derivative was synthesized.

An amount of 1,000.0 g (3.57 mol) of linoleic acid was placed in a four-necked flask and incorporated with 22.6 g (0.18 mol) of iodine, and 496.7 g (4.28 mol) of maleic acid was then added dropwise in a nitrogen atmosphere at 220° C. over a length of time of 2 hours. Subsequent aging was conducted for 2 hours, followed by removal of the residual maleic acid by means of steam sparging, whereby 1,219.8 g of a crude tribasic acid was prepared as a yellowish oily product.

An amount of 500.0 g (1.26 mol) of the tribasic acid induced from maleic acid was charged into a four-necked flask and dissolved in 500 g of methanol and thereafter incorporated with 10.0 g of sulfuric acid. The resulting solution was refluxed with heat until the acid value was rendered lower than 10. Upon completion of the reaction, the reaction liquid was repeatedly washed with water until a neutral pH value was reached. Subsequently, an organic layer was separated, and the residual solvent was distilled off in vacuo, whereby 413.9 g of a crude tribasic acid methyl ester was prepared as a yellowish oily product. After low-boiling matter was cut twice (0.8 torr, 130° C.), distillation was effected in vacuo (0.8 torr, 230° C.) so that 254.1 g of a methyl ester product was obtained as a pale yellowish oily product.

An amount of 200.0 g (0.46 mol) of the maleic acid-induced tribasic acid methyl ester was placed in a four-necked flask and dissolved in 200 g of n-heptane and then incorporated with 236.6 g (1.50 mol) of 2,2,6,6-tetramethyl-4-hydroxypiperidine and 13.2 g (68.4 mmol) of a 28% sodium methoxide solution, followed by refluxing of the resulting solution with heating in a nitrogen atmosphere for 5 hours. Upon completion of the reaction, water washing was so repeated that the reaction mixture was rendered neutral in its pH value. Subsequently, an organic layer was separated, and the residual solvent was removed by vacuum distillation, whereby 255.5 g of a hindered piperidine derivative of the following structures was produced as a yellowish oily product.

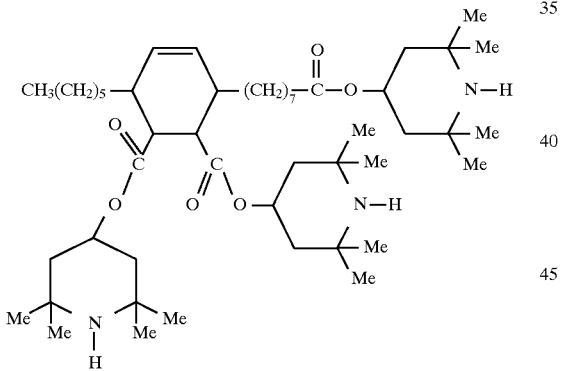

Synthesis Example 6

A tribasic acid was synthesized by use of fumaric acid and linoleic acid and converted to a methyl ester, from which a hindered piperidine derivative was synthesized.

An amount of 1000.0 g (3.57 mol) of linoleic acid was placed in a four-necked flask and incorporated with 22.6 g (0.18 mol) of iodine, and 496.7 g (4.28 mol) of fumaric acid was then added dropwise in a nitrogen atmosphere at 220° C. over a length of time of 2 hours. Subsequent aging was conducted for 2 hours, followed by removal of the residual fumaric acid by means of steam sparging, whereby 1,230.6 g of a crude tribasic acid was prepared as a yellowish oily product.

An amount of 500.0 g (1.26 mol) of the tribasic acid induced from fumaric acid was charged into a four-necked flask and dissolved in 500 g of methanol and thereafter incorporated with 10.0 g of sulfuric acid. The resulting solution was refluxed with heating until the acid value was rendered lower than 10. Upon completion of the reaction, the reaction liquid was repeatedly washed with water until a neutral pH value was reached. An organic layer was separated and vacuum-distilled to remove the residual solvent therefrom, whereby 406.5 g of a crude tribasic acid methyl ester was prepared as a yellowish oily product. After low-boiling matter was cut twice (0.8 torr, 130° C.), the crude methyl ester was distilled in vacuo (0.8 torr, 230° C.) with the result that 248.0 g of a methyl ester product was obtained as a pale yellowish oily product.

An amount of 200.0 g (0.46 mol) of the fumaric acid-induced tribasic acid methyl ester was placed in a four-necked flask and dissolved in 200 g of n-heptane and then incorporated with 236.6 g (1.50 mol) of 2,2,6,6-tetramethyl-4-hydroxypiperidine and 13.2 g (68.4 mmol) of a 28% sodium methoxide solution, followed by refluxing of the resulting solution with heating in a nitrogen atmosphere for 5 hours. Upon completion of the reaction, water washing was repeated until the reaction liquid was rendered neutral in its pH value. Subsequently to the washing step, an organic layer was separated and distilled in vacuo to remove the residual solvent therefrom, whereby 281.0 g of a hindered piperidine derivative of the following structure was produced as a yellowish oily product.

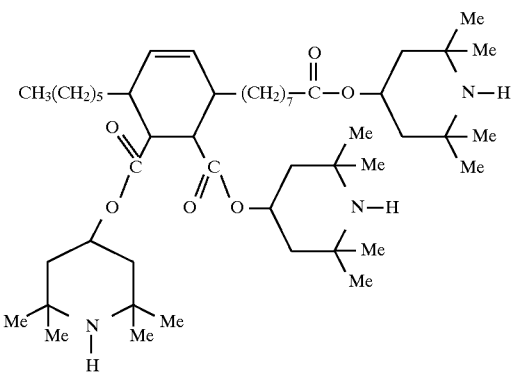

Synthesis Example 7

A tribasic acid was synthesized by use of maleic anhydride and linoleic acid and converted to a methyl ester, from which a hindered piperidine derivative was synthesized.

An amount of 1,000.0 g (3.57 mol) of linoleic acid was placed in a four-necked flask and incorporated with 22.6 g (0.18 mol) of iodine, and 419.6 g (4.28 mol) of maleic anhydride was then added dropwise in a nitrogen atmosphere at 220° C. over a length of time of 2 hours. Subsequent aging was conducted for 2 hours, followed by removal of the residual maleic anhydride by means of steam sparging, whereby 920.3 g of a crude tribasic acid was prepared as a yellowish oily product.

An amount of 500.0 g (1.32 mol) of the tribasic acid induced from maleic anhydride was charged into a four-necked flask and dissolved in 500 g of methanol and thereafter incorporated with 10.0 g of sulfuric acid. The resultant solution was refluxed with heat until the acid value was rendered lower than 10. Upon completion of the reaction, the reaction mixture was repeatedly washed with water until a neutral pH value was attained. Thereafter, an organic layer was separated, and the residual solvent was removed by vacuum distillation, whereby 416.3 g of a crude tribasic acid methyl ester was prepared as a yellowish oily product. After low-boiling matter was cut twice (0.8 torr, 130° C.), such methyl ester was distilled in vacuo (0.8 torr, 230° C.) so that 237.0 g of a methyl ester product was obtained as a yellowish oily product.

An amount of 200.0 g (0.46 mol) of the maleic anhydride-induced tribasic acid methyl ester was placed in a four-necked flask and dissolved in 200 g of n-heptane and then incorporated with 236.6 g (1.50 mol) of 2,2,6,6-tetramethyl-4-hydroxypiperidine and 13.2 g (68.4 mmol) of a 28% sodium methoxide solution, followed by refluxing of the resulting solution with heating in a nitrogen atmosphere for 5 hours. Upon completion of the reaction, the reaction liquid was repeatedly washed with water until the pH value was rendered neutral. After the washing step was completed, an organic layer was separated and vacuum-distilled to remove the residual solvent therefrom. Thus, 249.3 g of a hindered piperidine derivative of the following structure was produced as a brownish oily product.

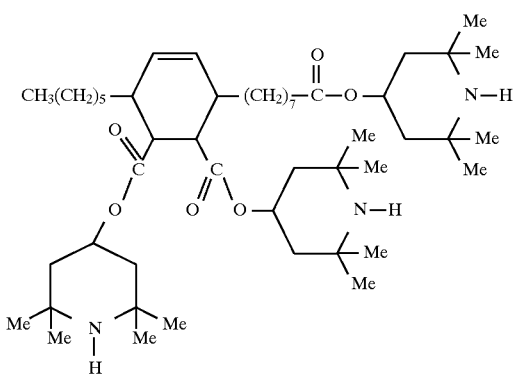

Examples 1 to 10 and Comparative Examples 1 to 6

In 100 parts by weight of a particulate polypropylene was incorporated each of the compounds listed in Table 1 in the amounts indicated in the same table. Also added was 0.05 part by weight of calcium stearate. The polypropylene used here resulted from slurry polymerization with use of a Ziegler-Natta catalyst and had an intrinsic viscosity of 1.9 as determined in tetralin at 135° C. and an isotacticity of 98%. The resultant formulation was fully admixed with a mixer and then subjected to melt kneading by use of an extruder with the following conditions: a cylinder temperature of 230° C.; L/D of 20 and a discharge diameter of 20 mm, followed by extrusion of the mixture in the form of a strand out of a die mounted on the extruder and by subsequent cutting and granulation of the strand into pellets.

Evaluation of Stability during Molding

To evaluate stability during molding of the pellet obtained above (1 Pass), a set of melting, extruding, cutting and granulating steps were repeated under the same conditions as given above (2 Pass).

MFR

As a measure of the change in molecular weight of the test resin during molding, the respective MFR of the 1 Pass and 2 Pass pellets was measured (JIS K7210, 230° C., 2.16 kg load, melt indexer manufactured by Toyo Seiki Seisakusho Co.). Namely, the molecular weight decreases upon subjection of the resin to oxidative deterioration at elevated temperature during molding, thus leading to increased MFR value. This means that the larger the increment of MFR between 1 Pass and 2 Pass, the more the resin deteriorates during molding; that is, the smaller the increment, the more the resin becomes resistant to deterioration during molding. The test results are shown in Table 2.

Color Shade

The respective b values were measured for both 1 Pass and 2 Pass pellets by the use of a color tester (SC-3) manufactured by Suga Shikenki Co. The larger the b value, the more yellowish the pellet gets. To be more specific, as the difference in b value between the 1 Pass and the 2 Pass desreases, the more resistant the resin becomes to deterioration at high temperatures during molding. The test results are shown in Table 2.

Evaluation of Stability during Practical Use

The 1 Pass and 2 Pass pellets were respectively press-molded further at 230° C. into thick sheet, from which a sample was cut and used for evaluation of the stability properties during the practical applications set forth hereunder.

Method of Evaluating Heat Aging

Measurement was made of the time required for a 65 mm×35 mm×0.5 mm sample to become brittle due to oxidative deterioration at 120° C. in a geer oven (Toyo Seiki Seisakusho Co.). The test results are shown in Table 3.

Method of Evaluating Light Stability

A 160 mm×25 mm×0.5 mm sample was exposed to light irradiation in a weatherometer (type: 65/XW-WR manufactured by Atlas Co., light source: xenon, black panel temperature: 80° C., rain fall: nil). The time was measured until the sample bent at an angle of 180 degrees began to crack from brittleness caused by oxidative deterioration. The test results are shown in Table 3.

Method of Evaluating Bleedout Resistance

Any additive having bled out on a surface of a molding invites increased haze of the molding. Hence, the increment between the hazes of the molding before and after light irradiation was taken as a measure of the magnitude of bleedout. Namely, after being irradiated with light as was in the case with the light stability itemized above, a 50 mm×30 mm×0.5 mm sample was measured with respect to its haze by means of a haze meter (Toyo Seiki Seisakusho Co.). Haze increment was computed by comparing it to the haze previously determined prior to light irradiation. The test results are shown in Table 3.

Examples 11 to 20 and Comparative Examples 7 to 12

Each of the compounds listed in Table 1 was incorporated in the amount tabulated therein into 100 parts by weight of a propylene-ethylene block copolymer. Also added was 0.05 part by weight of calcium stearate. The block copolymer used here resulted from slurry polymerization using of a Ziegler-Natta catalyst with an intrinsic viscosity of 2.3 as determined in tetralin at 135° C. and an ethylene content of 13% by weight. Under the same set of conditions as in Examples 1 to 10, pellet formation and specimen preparation were effected to evaluate the stability properties during molding of the resin and during practical use of the finished molding. The test results are shown in Tables 4 and 5.

TABLE 1

| Experiment No. | Experiment No. | Added Compd. Compound of | Formulated amount (wt %) |
|---|---|---|---|
| Example 1 | Example 11 | Synthesis Ex. 1 | 0.2 |
| Example 2 | Example 12 | Synthesis Ex. 1 | 0.4 |
| Example 3 | Example 13 | Synthesis Ex. 2 | 0.2 |
| Example 4 | Example 14 | Synthesis Ex. 3 | 0.2 |
| Example 5 | Example 15 | Synthesis Ex. 4 | 0.2 |
| Example 6 | Example 16 | Synthesis Ex. 5 | 0.2 |
| Example 7 | Example 17 | Synthesis Ex. 6 | 0.2 |
| Example 8 | Example 18 | Synthesis Ex. 7 | 0.2 |
| Example 9 | Example 19 | Synthesis Ex. 1 | 0.2 |
|  |  | Compound A | 0.1 |
| Example 10 | Example 20 | Synthesis Ex. 1 | 0.4 |
|  |  | Compound A | 0.1 |
| Com. Exam. 1 | Com. Exam. 7 | Compound B | 0.2 |
| Com. Exam. 2 | Com. Exam. 8 | Compound C | 0.2 |
| Com. Exam. 3 | Com. Exam. 9 | (Not added) | — |
| Com. Exam. 4 | Com. Exam. 10 | Compound B | 0.2 |
|  |  | Compound A | 0.1 |
| Com. Exam. 5 | Com. Exam. 11 | Compound C | 0.2 |
|  |  | Compound A | 0.1 |
| Com. Exam. 6 | Com. Exam. 12 | Compound A | 0.1 |

Compound A: tetrakis[methylene-3-(3,5-di-t-butyl-4-hydroxyphenyl) propionate}methan (supplied by Chiba-Gaigy under the Trade name IRGA-NOX 1010)
Compound B: bis(2,2,6,6-tetramethyl-4-piperidyl)sebacaete (supplied by Sakyou under the trade name Sanol LS-770)
Compound C: poly[{6-(1,1,3,3-tetramethylbutyl)imino-1,3,5-trazine-2,4-diy)iminol}-hexamethylene{(2,2,6,6-tetramethyl-4-piperidyl)inimo}] (supplied by Chiba-Gaigy under the trade name CHIMASSORB 944LD)

TABLE 2

|  | MFR (g/10 min) | | Color (b value) | |
|---|---|---|---|---|
|  | 1 Pass | 2 Pass | 1 Pass | 2 Pass |
| Example 1 | 1.2 | 2.4 | 0.5 | 1.5 |
| Example 2 | 1.1 | 2.0 | 0.9 | 1.8 |
| Example 3 | 1.2 | 2.4 | 0.6 | 1.6 |
| Example 4 | 1.2 | 2.5 | 0.7 | 1.8 |
| Example 5 | 1.1 | 2.4 | 0.7 | 1.7 |
| Example 6 | 1.0 | 2.2 | 0.7 | 1.7 |
| Example 7 | 1.0 | 2.3 | 0.6 | 1.7 |
| Example 8 | 1.0 | 2.2 | 0.7 | 1.6 |
| Com. Exam. 1 | 2.0 | 13.0 | 0.5 | 2.0 |
| Com. Exam. 2 | 1.6 | 11.4 | 1.1 | 5.4 |
| Com. Exam. 3 | 2.5 | 13.5 | 0.6 | 1.3 |
| Example 9 | 1.0 | 1.9 | 2.3 | 4.5 |
| Example 10 | 0.9 | 1.7 | 2.7 | 4.6 |
| Com. Exam. 4 | 1.1 | 2.4 | 2.5 | 5.5 |
| Com. Exam. 5 | 1.1 | 2.1 | 3.9 | 6.8 |
| Com. Exam. 6 | 1.1 | 2.3 | 1.7 | 5.8 |

TABLE 3

|  | Registivity for heat aging (hour) | light stability (hour) | Bleedout After 120 Hr | Bleedout After 400 Hr |
|---|---|---|---|---|
| Example 1 | 4500 | 1100 | 11 | 12 |
| Example 2 | 5700 | 1200 | 12 | 15 |
| Example 3 | 4400 | 1100 | 10 | 11 |
| Example 4 | 4300 | 1000 | 12 | 13 |
| Example 5 | 4000 | 1000 | 10 | 12 |
| Example 6 | 5500 | 1300 | 13 | 15 |
| Example 7 | 6000 | 1400 | 12 | 14 |
| Example 8 | 5700 | 1300 | 12 | 15 |
| Com. Exam. 1 | (*1) | (*1) | 15 | 25 |
| Com. Exam. 2 | (*1) | (*1) | 9 | 10 |
| Com. Exam. 3 | 20 | <40 | (*2) | (*2) |
| Example 9 | 5200 | 880 | 8 | 10 |
| Example 10 | 8200 | 980 | 11 | 15 |
| Com. Exam. 4 | 2200 | 960 | 15 | 24 |
| Com. Exam. 5 | 5000 | 860 | 6 | 7 |
| Com. Exam. 6 | 3300 | 180 | 6 | (*2) |

*1: Evaluation could not be made as the sample craked out when bended before evaluation.
*2: Evaluation could not be made due to heavy deterioration.

TABLE 4

|  | MFR (g/10 min) | | Color (b value) | |
|---|---|---|---|---|
|  | 1 Pass | 2 Pass | 1 Pass | 2 Pass |
| Example 11 | 1.2 | 2.3 | 0.7 | 1.6 |
| Example 12 | 1.1 | 2.0 | 1.0 | 1.7 |
| Example 13 | 1.0 | 2.1 | 0.8 | 1.7 |
| Example 14 | 1.1 | 2.2 | 0.8 | 1.9 |
| Example 15 | 1.0 | 1.9 | 0.9 | 1.8 |
| Example 16 | 1.0 | 2.0 | 0.7 | 1.7 |
| Example 17 | 0.9 | 2.1 | 0.8 | 1.6 |
| Example 18 | 0.9 | 1.9 | 0.7 | 1.6 |
| Com. Exam. 7 | 2.1 | 13.3 | 0.5 | 1.8 |
| Com. Exam. 8 | 1.7 | 11.8 | 1.2 | 5.2 |
| Com. Exam. 9 | 2.6 | 14.0 | 0.7 | 1.5 |
| Example 19 | 1.0 | 1.8 | 2.4 | 4.5 |
| Example 20 | 0.9 | 1.6 | 2.7 | 4.5 |
| Com. Exam. 10 | 1.2 | 2.6 | 2.6 | 5.4 |
| Com. Exam. 11 | 1.1 | 2.0 | 3.6 | 7.5 |
| Com. Exam. 12 | 1.2 | 2.1 | 1.7 | 6.0 |

TABLE 5

|  | Registivity for heat aging (hour) | light stability (hour) | Bleedout After 120 Hr | Bleedout After 400 Hr |
|---|---|---|---|---|
| Example 11 | 5400 | 1400 | 10 | 12 |
| Example 12 | 6900 | 1600 | 12 | 15 |
| Example 13 | 5200 | 1300 | 10 | 12 |
| Example 14 | 5200 | 1200 | 10 | 13 |
| Example 15 | 4900 | 1200 | 9 | 11 |
| Example 16 | 6500 | 1600 | 11 | 15 |
| Example 17 | 7100 | 1700 | 11 | 14 |
| Example 18 | 6900 | 1700 | 12 | 14 |
| Com. Exam. 7 | (*1) | (*1) | 14 | 25 |
| Com. Exam. 8 | (*1) | (*1) | 8 | 9 |
| Com. Exam. 9 | 20 | <40 | (*2) | (*2) |
| Example 19 | 6200 | 1100 | 8 | 10 |
| Example 20 | 9600 | 1200 | 12 | 16 |
| Com. Exam. 10 | 2500 | 1200 | 16 | 27 |
| Com. Exam. 11 | 5700 | 900 | 6 | 7 |
| Com. Exam. 12 | 3800 | 180 | 7 | (*2) |

As is clear from Tables 2 and 4, the resin compositions according to the present invention (Examples 1 to 8 and 11 to 18) exhibit only a small rise in MFR and a small extent of coloration, thus preventing deterioration at elevated temperatures during molding, as compared to the prior art equivalents (Comparative Examples 1, 2, 7 and 8). Though apt to invite increased coloration, the use of a phenol type antioxidant combined with the stabilizer of the invention (Examples 9, 10, 19 and 20) is effective to further avoid a rise in MFR, i.e., a decline in molecular weight.

The resin compositions of the prior art wherein a light stabilizer had been used alone (Comparative Examples 1, 2, 7 and 8) were extremely deteriorative and hence susceptible to cracking prior to testing as evidenced by Tables 3 and 5. Hence, a phenol type antioxidant needs to be added for the light stabilizer to produce its inherent function (Comparative Examples 4, 5, 10 and 11). Noticeably, the resin compositions of this invention excel both in light stability and in bleedout resistance without the need for a phenol type antioxidant (Examples 1 to 8 and 11 to 18).

Although free from a phenol type antioxidant, the resin compositions of the invention (Examples 1 to 8 and 11 to 18 are in practice satisfactory in regard to heat aging resistance, light stability and bleedout resistance as is apparent from Tables 3 and 5. Even when using a phenol type antioxidant, the resin compositions of the invention (Examples 9, 10, 19 and 20) are superior to those of the prior art (Comparative Examples 4, 5, 10 and 11) in respect to light stability and bleedout resistance.

Synthesis Example 8

A dibasic acid prepared synthetically by use of linoleic acid and acrylic acid was converted into a methyl ester, from which a hindered piperidine derivative was thereafter synthesized by means of ester exchange reaction. Next, this derivative was N-methylated to synthesize a N-methyl product.

In a four-necked flask were placed 1,000.0 g (3.57 mol) of linoleic acid and 22.6 g (0.18 mol) of iodine. To the resulting mixture was added dropwise 308.3 g (4.28 mol) of acrylic acid in a nitrogen atmosphere at 220° C. over a passage of time of 2 hours. Upon aging for 2 hours, the reaction liquid was steam-purged to remove the residual acrylic acid, whereby 1,218.7 g of a crude dibasic acid was prepared as a pale brownish oily product. After low-boiling matter was cut twice (0.8 torr, 160° C.), the crude dibasic acid was distilled in vacuo (0.8 torr, 240° C.) so that 548.7 g of a dibasic acid was obtained as a pale yellowish oily product.

Into a four-necked flask was charged 500.0 g (1.42 mol) of the above dibasic acid which was then dissolved in 500 g of methanol and incorporated with 10.0 g of sulfuric acid. Refluxing with heat was conducted until the reaction liquid was rendered lower than 10 in its acid value. On completion of the reaction, the reaction liquid was washed repeatedly with water until the pH value was made neutral, followed by separation of an organic layer and by subsequent removal of the solvent through vacuum distillation, whereby 505.7 g of a dibasic acid methyl ester was provided as a pale yellowish oily product.

An amount of 400.0 g (1.05 mol) of the dibasic acid methyl ester thus obtained was put into a four-necked flask and dissolved in 400 g of n-heptane. The resultant solution was then incorporated with 363.6 g (2.31 mol) of 2,2,6,6-tetramethyl-4-hydroxypiperidine and 20. 1g (0.11 mol) of a 28% sodium methoxide solution, and refluxing was conducted in a nitrogen atmosphere for 5 hours. After completion of the reaction, water washing was repeated until the reaction liquid was made neutral, followed by separation of an organic layer and by subsequent removal therefrom of the solvent by means of vacuum distillation. Thus, 453.6 g of a piperidine derivative was prepared as a pale yellowish oily product.

In a four-necked flask was placed 400.0 g (0.63 mol) of the resulting piperidine derivative which was then dissolved in 400 g toluene. To the resultant solution were added dropwise in a nitrogen atmosphere at room temperature 291.8 g (6.34 mol) of formic acid and 244.8 g (2.85 mol) of 35% formalin. After a water-removing pipe was further mounted on the flask, refluxing was performed for 10 hours. An amount of 500 ml of a 1% sodium hydroxide solution was added to the reaction liquid to thereby separate an organic layer which was then washed four times with water (1,000 ml). A further organic layer was separated, dried over sodium sulfate and filtered, followed by removal of the filtrate through vacuum distillation. In this way, 339.2 g of a N-methyl product of the following structures was produced as a pale yellowish oily product.

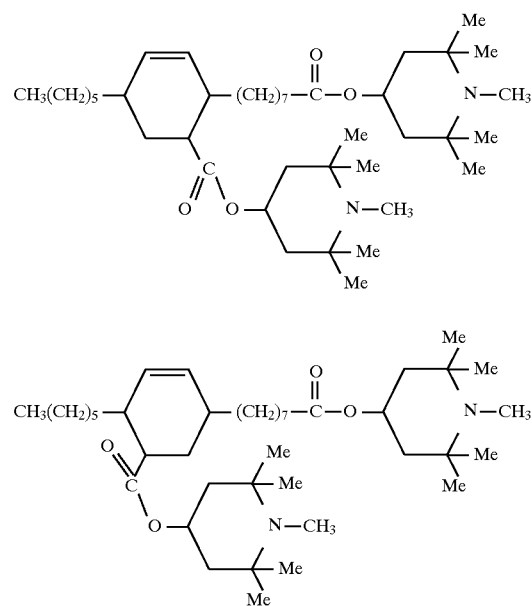

Synthesis Example 9

The hindered piperidine derivative obtained in Synthesis Example 8 was N-acetylated to synthesize a N-acetyl product.

In a four-necked flask was placed 400.0 g (0.63 mol) of a piperidine derivative prepared in Synthesis Example 8 but not N-acetylated, followed by addition of 194.2 g (1.90 mol) of acetic anhydride, 4.0 g of 4-dimethylaminopyridine and 400 g of pyridine. Refluxing was done in a nitrogen atmosphere for 5 hours. The resulting reaction liquid was concentrated in vacuo, and the residue was dissolved in 2,000 ml of toluene and washed four times with water (1,000 ml). An organic layer was separated, dried over sodium sulfate and filtered, followed by removal of the filtrate through vacuum distillation and by subsequent origin removal (solvent system: ethyl acetate/n-hexane=1/1) of the residue with use of 2,000 g of silica gel. Thus, 397.3 g of a N-acetyl product of the following structures was produced as a brownish oily product.

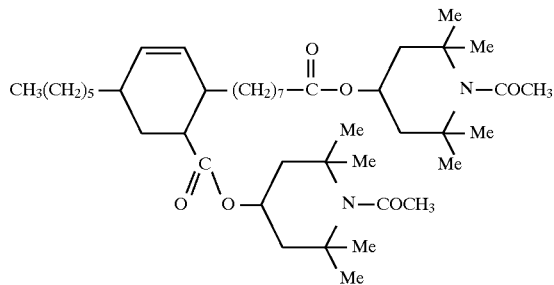

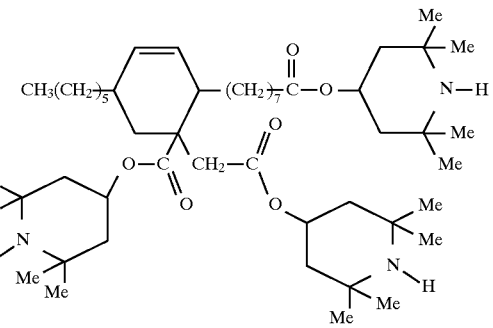

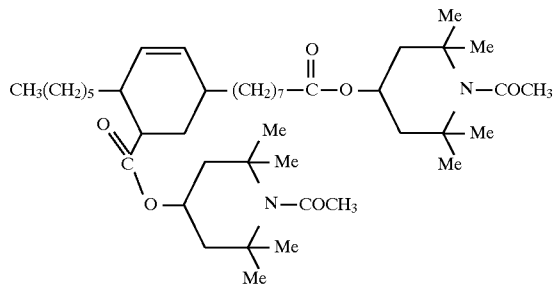

Synthesis Example 10

A tribasic acid prepared synthetically by addition reaction of linoleic acid and itaconic anhydride was converted into a methyl ester, from which a hindered piperidine derivative was thereafter synthesized by ester exchange reaction.

In a four-necked flask was placed 1,000.0 g (3.57 mol) of linoleic acid and then 22.6 g (0.18 mol) of iodine. To the resulting mixture was added dropwise 479.6 g (4.28 mol) of itaconic anhydride in a nitrogen atmosphere at 220° C. over a passage of time of 2 hours. Upon aging for 2 hours, the reaction mixture was steam-purged to remove the residual itaconic anhydride, whereby 1,189.0 g of a crude tribasic acid was prepared as a yellowish oily product.

Into a four-necked flask was charged 500.0 g (1.27 mol) of the above tribasic acid which was then dissolved in 500 g of methanol and incorporated with 10.0 g of sulfuric acid. Refluxing with heat was conducted until the reaction liquid was rendered lower than 10 in its acid value. On completion of the reaction, the reaction liquid was repeatedly washed with water until the pH value was made neutral, followed by separation of an organic layer and by subsequent removal of the solvent through vacuum distillation, whereby 456.7 g of a crude tribasic acid methyl ester was provided as a yellowish oily product. After low-boiling matter was cut twice (0.8 torr, 130° C.), the crude dibasic acid was distilled in vacuo (0.8 torr, 230° C.) so that 265.8 g of a methyl ester product was obtained as a yellowish product.

An amount of 200.0 g (0.44 mol) of the tribasic acid methyl ester thus obtained was put into a four-necked flask and dissolved in 200 g of n-heptane. The resultant solution was then incorporated with 229.3 g (1.46 mol) of 2,2,6,6-tetramethyl-4-hydroxypiperidine and 12.8 g (66.3 mmol) of a 28% sodium methoxide solution, and refluxing was conducted in a nitrogen atmosphere for 5 hours. Upon completion of the reaction, the reaction liquid was washed repeatedly with water until a neutral pH value was attained, followed by separation of an organic layer and by subsequent removal of the solvent by means of vacuum distillation. Thus, 143.3 g of a piperidine derivative of the following structure was produced as a brownish oily product.

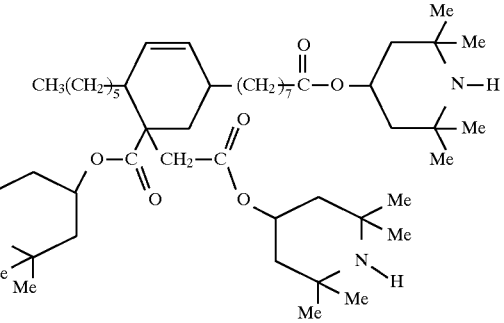

Synthesis Example 11

A tribasic acid prepared synthetically by addition reaction of linoleic acid and mesaconic acid was converted into a methyl ester, from which a hindered piperidine derivative was thereafter synthesized by ester exchange reaction.

In a four-necked flask was placed 1,000.0 g (3.57 mol) of linoleic acid and then 22.6 g (0.18 mol) of iodine. To the resulting mixture was added dropwise 556.7 g (4.28 mol) of mesaconic acid in a nitrogen atmosphere at 220° C. over a passage of time of 2 hours. Upon aging for 2 hours, the reaction mixture was steam-purged to remove the residual mesaconic acid, whereby 1,125.0 g of a crude tribasic acid was prepared as a yellowish oily product.

Into a four-necked flask was charged 500.0 g (1.22 mol) of the above tribasic acid which was then dissolved in 500 g of methanol and incorporated with 10.0 g of sulfuric acid. Refluxing was conducted with heating until the reaction liquid was rendered lower than 10 in its acid value. Upon completion of the reaction, water washing was repeated until the reaction liquid was made neutral, followed by separation of an organic layer and by subsequent removal therefrom of the solvent through vacuum distillation, whereby 481.5 g of a crude tribasic acid methyl ester was provided as a yellowish oily product. After low-boiling matter was cut twice (0.8 torr, 130° C.), the crude dibasic acid was distilled in vacuo (0.8 torr, 230° C.) so that 217.0 g of a methyl ester product was obtained as a yellowish oily product.

An amount of 200.0 g (0.44 mol) of the methyl ester product thus obtained was put into a four-necked flask and dissolved in 400 g of n-heptane. The resultant solution was then incorporated with 229.3 g (1.46 mol) of 2,2,6,6-tetramethyl-4-hydroxypiperidine and 12.8 g (66.3 mmol) of a 28% sodium methoxide solution, and refluxing was conducted in a nitrogen atmosphere for 5 hours. Upon completion of the reaction, the reaction liquid was washed repeatedly with water until a neutral pH value was attained, followed by separation of an organic layer and by subsequent removal of the solvent by means of vacuum distillation. Thus, 159.4 g of a hindered piperidine derivative of the following structure was produced as a brownish oily product.

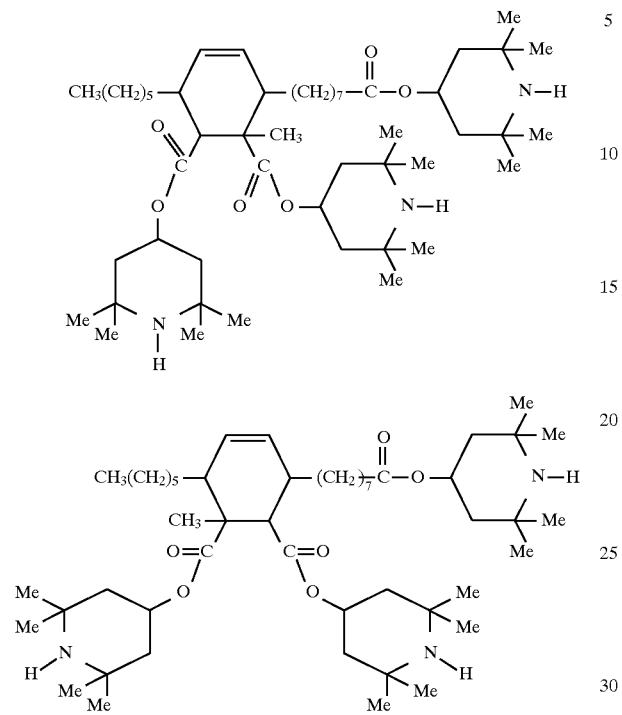

Synthesis Example 12

A tribasic acid prepared synthetically by addition reaction of linoleic acid and citraconic anhydride was converted into a methyl ester, from which a hindered piperidine derivative was thereafter synthesized by ester exchange reaction.

In a four-necked flask was placed 1,000.0 g (3.57 mol) of linoleic acid and then 22.6 g (0.1 8 mol) of iodine. To the resulting mixture was added dropwise 479.6 g (4.28 mol) of citraconic anhydride in a nitrogen atmosphere at 220° C. over a passage of time of 2 hours. Upon aging for 2 hours, the reaction mixture was steam-purged to remove the residual citraconic anhydride, whereby 1,339.8 g of a crude tribasic acid was prepared as a yellowish oily product.

Into a four-necked flask was charged 500.0 g (1.27 mol) of the above tribasic acid which was then dissolved in 500 g of methanol and incorporated with 10.0 g of sulfuric acid. Heat refluxing was conducted until the reaction liquid was rendered lower than 10 in its acid value. Upon completion of the reaction, the reaction liquid was repeatedly washed with water until the pH value was made neutral, followed by separation of an organic layer and by subsequent removal of the solvent through vacuum distillation, whereby 482.5 g of a crude tribasic acid methyl ester was provided as a brownish oily product. After low-boiling matter was cut twice (0.8 torr, 130° C.), the crude dibasic acid was distilled in vacuo (0.8 torr, 230° C.) so that 257.5 g of a methyl ester product was obtained as a yellowish product.

An amount of 200.0 g (0.44 mol) of the tribasic acid methyl ester thus obtained was put into a four-necked flask and dissolved in 200 g of n-heptane. The resultant solution was then incorporated with 229.3 g (1.46 mol) of 2,2,6,6-tetramethyl-4-hydroxypiperidine and 12.8 g (66.3 mmol) of a 28% sodium methoxide solution, and refluxing was conducted in a nitrogen atmosphere for 5 hours. After completion of the reaction, the reaction liquid was repeatedly washed with water until a neutral pH value was attained, followed by separation of an organic layer and by subsequent removal of the solvent by means of vacuum distillation. Thus, 151.1 g of a piperidine derivative of the following structure was produced as a brownish oily product.

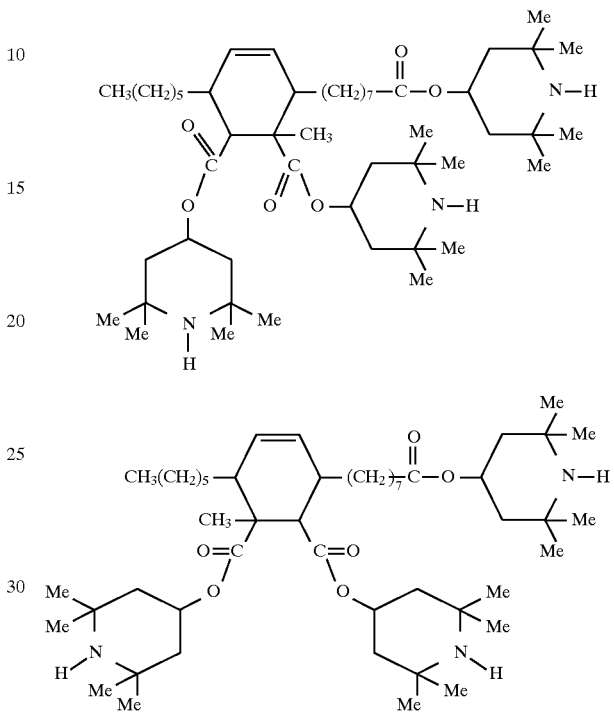

Synthesis Example 13

A dibasic acid prepared synthetically by addition reaction of linoleic acid and methacrylic acid was converted into a methyl ester, from which a hindered piperidine derivative was thereafter synthesized by ester exchange reaction.

In a four-necked flask was placed 1,000.0 g (3.57 mol) of linolic acid and then 22.6 g (0.18 mol) of iodine. To the resulting mixture was added dropwise 368.4 g (4.28 mol) of methacrylic acid in a nitrogen atmosphere at 220° C. over a passage of time of 2 hours. Upon aging for 2 hours, the reaction liquid was steam-purged to remove the residual methacrylic acid, whereby 1,084.5 g of a crude dibasic acid was prepared as a yellowish oily product. After low-boiling matter was cut twice (0.8 torr, 160° C.), the crude dibasic acid was distilled in vacuo (0.8 torr, 260° C.) so that 561.5 g of a dibasic acid was obtained as a pale yellowish oily product.

The dibasic acid thus obtained was dissolved in an amount of 500.0 g in 1,000 ml of toluene, and to the resulting solution was added dropwise 324.6 g (2.73 mol) of thionyl chloride over a passage of time of 1 hour. Refluxing with heat was effected for 1 hour, followed by vacuum concentration of the reaction liquid until the latter was decreased nearly by half and by subsequent dropping of the concentrate in 1,000 g of methanol over a passage of time of 1 hour. The reaction liquid after being cooled was incorporated with 1,000 ml of toluene and washed three times with water (1,000 ml), whereby an organic layer was separated and distilled in vacuo so as to remove the solvent therefrom. Thus, there was provided 533.3 g of a dibasic acid methyl ester as a brownish oily product.

An amount of 200.0 g (0.51 mol) of the resultant methyl ester product was charged into a four-necked flask and dissolved in 200 g of n-heptane and then incorporated with 175.4 g (1.12 mol) of 2,2,6,6-tetramethyl-4-hydroxypiperidine and 9.78 g (50.7 mmol) of a 28% sodium methoxide solution. Refluxing with heat was done in a nitrogen atmosphere for 5 hours. Upon completion of the reaction, water washing was repeated until the reaction liquid was rendered neutral, followed by separation of an organic layer and by subsequent removal of the solvent through vacuum distillation. Thus, there was produced 208.7 g of a piperidine derivative of the following structure as a brownish oily product.

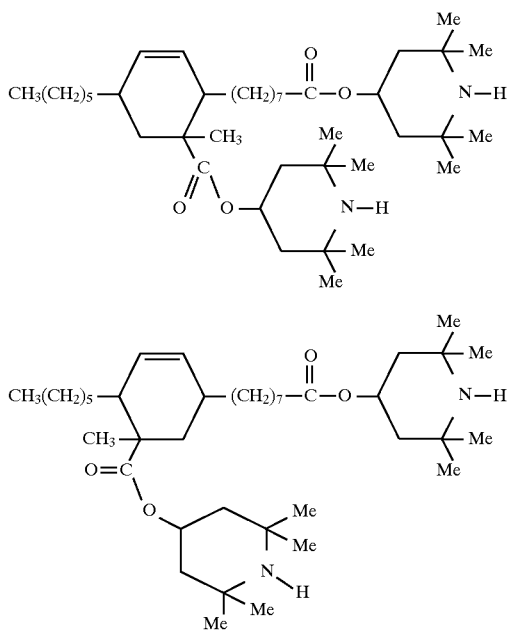

Examples 21 and 22

The procedure of Examples 1 to 10 was followed except that 0.2 part by weight of each of the compounds listed in Table 6 was used in place of those listed in Table 1. The test results are shown in Table 6.

TABLE 6

|  | Added compound | MFR (1 pass) (g/10 min) | Registivity for heat aging (hour) | stability (hour) |
|---|---|---|---|---|
|  | Compound of |  |  |  |
| Example 21 | Synthesis Ex. 8 | 1.2 | 6200 | 1100 |
| Example 22 | Synthesis Ex. 9 | 1.3 | 4800 | 1000 |

(Compound 2)

Synthesis Example 14

A dibasic acid obtained synthetically by addition reaction of tall oil and acrylic acid was hydrogenated and then converted into a methyl ester, from which a hindered piperidine derivative was synthesized by ester exchange reaction.

Into a pressurized reactor was charged 300.0 g of a dibasic acid synthesized by addition reaction of tall oil and acrylic acid and having a carbon number of 21 (acid value: 271.0, chief ingredient: 5 (or 6)-carboxy-4-hexyl-2-cyclohexene-1-octanoic acid, purity: above 90%, starting fatty acid contained in an amount of less than 10%), and the interior of the reactor was replaced with a nitrogen gas. A 5% palladium carbon of a hydrous nature (water content: 50.0%) was then added in an amount of 3.0 g to the reactor which was thereafter closed. After complete replacement of the interior of the reactor by introduction of a hydrogen gas, stirring was conducted at 200° C. for 3 hours with hydrogen pressure set at 100 kg/cm². After completion of the reaction, the reaction system was cooled to 120° C., and the catalyst was filtered with a pressurized filter to obtain a hydrogenated dibasic acid in which all of the unsaturated bonds had been reduced.

An amount of 300.0 g (acid value: 271.0) of the hydrogenated dibasic acid was dissolved in 300 g of methanol, and 6.0 g of sulfuric acid was put into the reactor. Refluxing with heat was effected until the acid value of the reaction liquid was made smaller than 10. Upon completion of the reaction, water washing was repeated until a neutral pH value was reached, followed by removal of the residual water and solvent through vacuum distillation. Thus, there was obtained a methyl ester product of a hydrogenated dibasic acid having an acid value of smaller than 1 and a chemical structure wherein the carboxylic acid had been converted in its entirety into the form of a methyl ester.

An amount of 200 g of the dibasic acid methyl ester so hydrogenated was dissolved in 200 g of xylene, and 171 g of 2,2,6,6-tetramethyl-4-hydroxypiperidine and 19.2 g of a 28% sodium methoxide solution were placed in the reactor, followed by refluxing of the resulting solution with heating for 5 hours. Completion of the reaction was followed by repeated washing of the reaction liquid with water until the pH value was made neutral, and the residual water and solvent were then removed by vacuum distillation. Thus, there was provided a 4-(2,2,6,6-tetramethylpiperidyl)ester of a hydrogenated dibasic acid which was composed predominantly of the following structures (a) and (b) each having a piperidyl ester exchanged for a methyl ester.

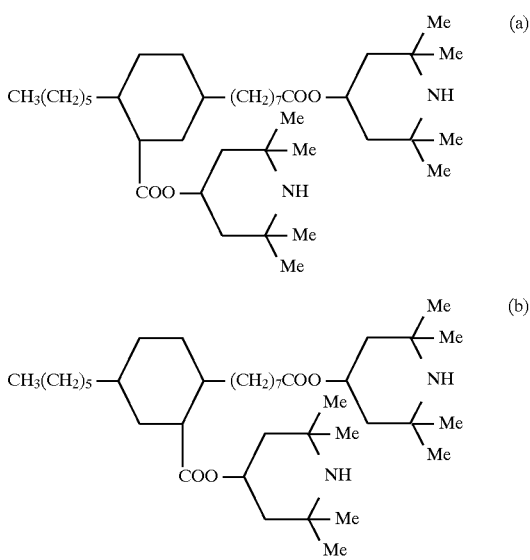

Synthesis Example 15

Synthesis of Hindered Piperidine Derivative Having Amide Linkages

An amount of 100 g of a methyl ester product of a dibasic acid prepared as in Synthesis Example 1 was dissolved in 100 g of xylene, and 86 g of 2,2,6,6-tetramethyl-4-aminopiperidine and 9.6 g of a 28% sodium methoxide solution were placed in a reactor, followed by refluxing of the resulting solution with heating for 5 hours. After completion of the reaction, the reaction liquid was repeatedly washed with water until a neutral pH value was reached, and the residual water and solvent were then removed by vacuum distillation. Thus, a 4-(2,2,6,6-tetramethylpiperidyl) amide of a hydrogenated dibasic acid was provided which was made up predominantly of the following structures (c) and (d) each having a piperidyl amide exchanged for a methyl ester.

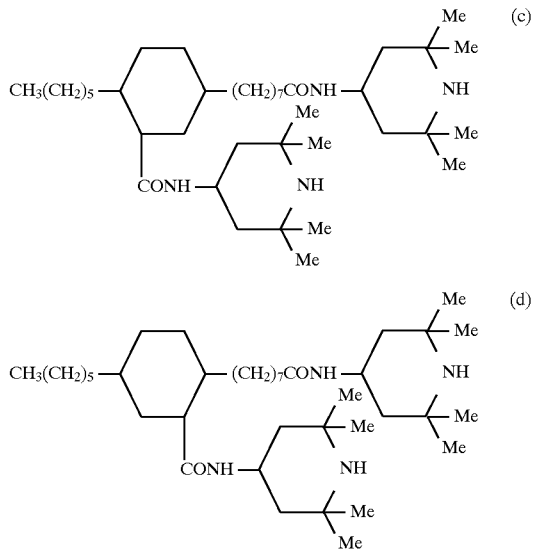

Examples 23 to 26

In 100 parts by weight of a particulate polypropylene was incorporated each of the compounds listed in Table 7 in the amount indicated in that table. Also added was 0.05 part by weight of calcium stearate. The polymer tested here was one derived from slurry polymerization using a Ziegler-Natta catalyst and having an intrinsic viscosity of 1.9 as determined in tetralin at 135° C. and an isotacticity of 98%. Each formulation was fully admixed on a mixer and then melt-kneaded by means of an extruder with the following set of conditions: a cylinder temperature of 230° C., an L/D of 20; and a discharge diameter of 20 mm. The resulting admixture was extruded into the form of a strand out of a die assembled in the extruder, and the strand was then cut and granulated into pellets.

Evaluation of Stability during Molding

MFR

As a measure of the change in molecular weight of the test resin during molding, the MFR of the pellet was measured (JIS K7210, 230° C., 2.16 kg loading, melt indexer manufactured by Toyo Seiki Seisakusho Co.). Namely, the molecular weight decreases upon exposure of the resin to oxidative deterioration at elevated temperature during molding, thus resulting in increased MFR values. This means that the smaller the MFR value, the more the resin is resistant to deterioration during molding. The test results are shown in Table 8.

Color Shade

The b value of the pellets was measured by use of a color tester (SC-3) manufactured by Suga Shikenki Co. The smaller the b value, the less yellow pellets become.

Evaluation of Stability during Practical Use

The pellets were further subjected to press molding at 230° C. to thereby form 0.5 mm thick sheets, from which a sample was cut and used for evaluation of the stability performance during the practical applications set forth hereunder.

Method of Evaluating Heat Aging

Measurement was made of the time required for a 65 mm×35 mm×0.5 mm sample to become brittle owing to oxidative deterioration at 120° C. in a geer oven (Toyo Seiki Seisakusho Co.). The test results are shown in Table 8.

Method of Evaluating Light Stability

A 160 mm×25 mm×0.5 mm sample was exposed to light irradiation in a weatherometer (type: 65/XW-WR manufactured by Atlas Co., light source: xenon, black panel temperature: 80° C., rain fall: nil). The time was measured until the sample bent at an angle of 180 degrees began to crack from bliotleness caused by oxidative detioration. The test results are shown in Table 8.

Method of Evaluating Bleedout Resistance

Any additive having bled out on a surface of a molding invites increased haze of the molding. Hence, the increment between the hazes of the molding before and after light irradiation was taken as a measure of the magnitude of bleedout. Namely, after being irradiated with light as was in the case with the light stability itemized above, a 50 mm×30 mm×0.5 mm sample was measured with respect to its haze by means of a haze meter (Toyo Seiki Seisakusho Co.). Haze increment was computed by comparing it to the haze previously determined prior to light irradiation. The test results are shown in Table 8.

Examples 27 to 30

Each of the compounds listed in Table 1 was incorporated in the amount tabulated therein into 100 parts by weight of a propylene-ethylene block copolymer. Also added was 0.05 part by weight of calcium stearate. The block copolymer used here resulted from slurry polymerization using a Ziegler-Natta catalyst with an intrinsic viscosity of 2.3 as determined in tetralin at 135° C. and an ethylene content of 13% by weight. Under the same set of conditions as in Examples 23 to 26, pellet formation and specimen preparation were effected to evaluate the stability properties during molding and during practical use. The test results are shown in Table 9. In the following Tables, Compound A, compound B and compound C is same as shown in the Table 1.

TABLE 7

| Experiment No. | Experiment No. | Added Compd. | Formulated amount (wt %) |
|---|---|---|---|
| | | Compound of | |
| Example 23 | Example 27 | Synthesis Ex. 14 | 0.2 |
| Example 24 | Example 28 | Synthesis Ex. 15 | 0.2 |
| Example 25 | Example 29 | Synthesis Ex. 14 | 0.2 |
| | | Compound A | 0.1 |
| Example 26 | Example 30 | Synthesis Ex. 15 | 0.2 |
| | | Compound A | 0.1 |

TABLE 8

| | MFR (g/10 min) | Color (b value) | Registivity for heat aging (hour) | Light stability (hour) | Bleedout (after) 120 Hr | 400 Hr |
|---|---|---|---|---|---|---|
| Example 23 | 1.2 | 0.6 | 4800 | 1000 | 11 | 12 |
| Example 24 | 1.1 | 0.7 | 4200 | 1400 | 12 | 13 |
| Com. Exam. 1 | 2.0 | 0.5 | (*1) | (*1) | 15 | 25 |
| Com. Exam. 2 | 1.6 | 1.1 | (*1) | (*1) | 9 | 10 |
| Com. Exam. 3 | 2.5 | 0.6 | 20 | <40 | (*2) | (*2) |
| Example 25 | 0.9 | 2.5 | 5000 | 800 | 8 | 9 |
| Example 26 | 0.9 | 2.7 | 5200 | 860 | 10 | 11 |
| Com. Exam. 4 | 1.1 | 2.5 | 2200 | 960 | 15 | 24 |
| Com. Exam. 5 | 1.1 | 3.9 | 5000 | 860 | 6 | 7 |
| Com. Exam. 6 | 1.1 | 1.7 | 3300 | 180 | 6 | (*2) |

*1: Evaluation could not be made as the sample craked out when bended before evaluaion.
*2: Evaluation coule not be made due to heavy deterioration.

TABLE 9

| | MFR (g/10 min) | Color (b value) | Registivity for heat aging (hour) | Light stability (hour) | Bleedout (after) 120 Hr | 400 Hr |
|---|---|---|---|---|---|---|
| Example 27 | 1.2 | 0.7 | 4900 | 1200 | 10 | 11 |
| Example 28 | 1.2 | 0.8 | 4500 | 1600 | 12 | 13 |
| Com. Exam. 7 | 2.1 | 0.5 | (*1) | (*1) | 14 | 25 |
| Com. Exam. 8 | 1.7 | 1.2 | (*1) | (*1) | 8 | 9 |
| Com. Exam. 9 | 2.6 | 0.7 | 20 | <40 | (*2) | (*2) |
| Example 29 | 1.0 | 2.5 | 5800 | 1000 | 9 | 10 |
| Example 30 | 1.0 | 2.6 | 6000 | 920 | 10 | 11 |
| Com. Exam. 10 | 1.2 | 2.6 | 2500 | 1200 | 16 | 27 |
| Com. Exam. 11 | 1.1 | 3.6 | 5700 | 900 | 6 | 7 |
| Com. Exam. 12 | 1.2 | 1.7 | 3800 | 180 | 7 | (*2) |

*1: Evaluation could not be made as the sample craked out when bended before evaluation.
*2: Evaluation could not be made due to heavy deterioration.

(Compound 3)

Synthesis Example 16

The compound represented by Formula (III) may be produced for example by, but should not be considered limited to, the method given hereunder.

In this synthesis example, a dimer acid derived by synthesis from tall oil was hydrogenated and then synthesized by ester exchange reaction into a hindered piperidine derivative via a methyl ester.

Hydrogenation Reaction of Dimer Acid

Into a pressurized reactor was charged 300 g of a dimer acid (acid value: 195.0, acyclic structure/cyclic structure: 20/80) synthesized from tall oil, and the interior of the reactor was replaced interiorly with a nitrogen gas. A 5% palladium carbon of a hydrous nature (water content: 50.0%) was then added in an amount of 1.5 g to the reactor which was thereafter closed. After complete replacement of the interior of the reactor with a hydrogen gas, stirring was conducted at 200° C. for 3 hours with hydrogen pressure set at 100 kg/cm². After completion of the reaction, the reaction system was cooled to 120° C., and the catalyst was filtered with a pressurized filter. Thus, a hydrogenated dimer acid of less than 10 in iodine value was obtained.

Methyl Esterification Reaction of Hydrogenated Dimer Acid

An amount of 500 g of a hydrogenated dimer acid was dissolved in 500 g of methanol, and 10.0 g of sulfuric acid was put into the reactor. Heat refluxing was done until the acid value of the resulting solution became less than 10. On completion of the reaction, water washing was repeated until a neutral pH value was reached, followed by removal of the residual water and solvent through vacuum distillation. Thus, a methyl ester product was prepared.

An amount of 200 g of the methyl ester product was dissolved in 200 g of xylene, and 115 g of 2,2,6,6-tetramethyl-4-hydroxypiperidine and 12.9 g of a 28% sodium methoxide solution were placed in the reactor, followed by refluxing of the resulting solution with heating for 3 hours. Completion of the reaction was followed by repeated washing of the reaction liquid with water until the pH value was made neutral, and the residual water and solvent were removed by vacuum distillation. Thus, there was provided a hindered piperidine compound composed predominantly of the following structures (a) and (b) and having a purity of 98%, a viscosity of 5,980 cps (25° C.) and a specific gravity of 0.970 (25° C.).

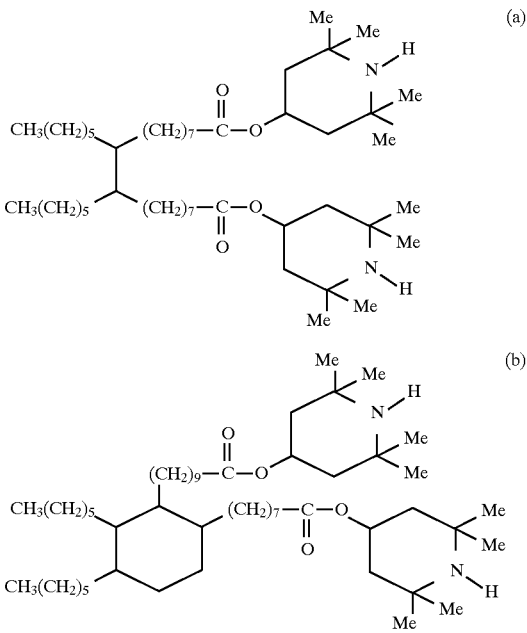

Examples 31 and 32

To 100 parts by weight of a particulate polypropylene was added each of the compounds listed in Table 10 in the amount indicated in that table. Also added was 0.05 part by weight of calcium stearate. The polypropylene used here was one derived from slurry polymerization using a Ziegler-Natta catalyst and having an intrinsic viscosity of 1.9 as determined in tetralin at 135° C. and an isotacticity of 98%. Each formulation was fully admixed on a mixer and then melt-kneaded by means of an extruder with the following set of conditions: a cylinder temperature of 230° C.; an L/D of 20; and a discharge diameter of 20 mm. The resulting admixture was extruded into the form of a strand out of a die attached to the extruder, and the strand was then cut and granulated into pellets.

The pellet thus formed was press-molded at 230° C. into a sheet in a thickness of 0.5 mm for use in the following tests.

Method of Evaluating Light Stability

A 160 mm×25 mm×0.5 mm sample was exposed to light irradiation in a weatherometer (type: 65/XW-WR manufactured by Atlas Co., light source: xenon, black panel temperature: 80° C., rain fall: nil). The time was measured until the sample bent at an angle of 180 degrees began to crack from blittleness caused by oxidative deterioration. The test results are shown in Table 11.

Method of Evaluating Bleedout Resistance

Any additive having bled out on a surface of a molding invites increased haze of the molding. Hence, the increment between the hazes of the molding before and after light irradiation was taken as a measure of the magnitude of bleedout. Namely, after being irradiated with light as was in the case with the light stability itemized above, a 50 mm× 30 mm×0.5 mm sample was measured with respect to its haze by means of a haze meter (Toyo Seiki Seisakusho Co.). Haze increment was computed by comparing it to the haze previously determined prior to light irradiation. The test results are shown in Table 11.

Examples 33 and 34

Each of the compounds listed in Table 10 was added in the amount tabulated therein to 100 parts by weight of a propylene-ethylene block copolymer. Also added was 0.05 part by weight of calcium stearate. The block copolymer used here resulted from slurry polymerization using a Ziegler-Natta catalyst with an intrinsic viscosity of 2.3 as determined in tetralin at 135° C. and an ethylene content of 13% by weight. Each formulation was fully admixed on a mixer and then melt-kneaded by use of an extruder with the following conditions: a cylinder temperature of 230° C.; an L/D of 20; and a discharge diameter of 20 mm. The resulting admixture was extruded into the form of a strand out of a die assembled in the extruder, and the strand was then cut and granulated into pellets.

The resulting pellet was press-molded at 230° C. into a 0.5 mm thick sheet for use in the same tests as in Examples 31 and 32. The test results are shown in Table 12.

TABLE 10

| Experiment No. | Experiment No. | Added Compd. Compound of | Formulated amount (wt %) |
|---|---|---|---|
| Example 31 | Example 33 | Synthesis Ex. 16 | 0.2 |
| Example 32 | Example 34 | Synthesis Ex. 16 | 0.4 |

TABLE 11

| | Light stability (hour) | Bleedout After 120 Hr | Bleedout After 400 Hr |
|---|---|---|---|
| Example 31 | 1100 | 6 | 6 |
| Example 32 | 1200 | 11 | 10 |
| Com. Exam. 1 | (*1) | 15 | 25 |
| Com. Exam. 2 | (*1) | 9 | 10 |
| Com. Exam. 3 | <40 | (*2) | (*2) |
| Com. Exam. 4 | 960 | 15 | 24 |
| Com. Exam. 5 | 860 | 6 | 7 |
| Com. Exam. 6 | 180 | 6 | (*2) |

*1: Evaluation could not be made as the sample craked out when bended before evaluation.
*2: Evaluation could not be made due to heavy deterioration.

TABLE 12

| | Light stability (hour) | Bleedout After 120 Hr | Bleedout After 400 Hr |
|---|---|---|---|
| Example 33 | 1400 | 6 | 6 |
| Example 34 | 1600 | 9 | 10 |
| Com. Exam. 7 | (*1) | 14 | 25 |
| Com. Exam. 8 | (*1) | 8 | 9 |
| Com. Exam. 9 | <40 | (*2) | (*2) |
| Com. Exam. 10 | 1200 | 16 | 27 |
| Com. Exam. 11 | 900 | 6 | 7 |
| Com. Exam. 12 | 180 | 7 | (*2) |

*1: Evaluation could not be made as the sample craked out when bended before evaluation.
*2: Evaluation could not be made due to heavy deterioration.

As is evident from Tables 11 and 12, the prior art compositions having a light stabilizer used alone (Comparative Examples 1, 2, 7 and 8) were extremely deteriorative and hence susceptible to cracking even before testing. In such instances, a phenol type antioxidant needs to be further formulated to allow the light stabilizer to provide its inherent function (Comparative Examples 4, 5, 10 and 11). In contrast, the compositions of this invention have been found to be excellent both in light stability and in bleedout resistance even without a phenol type antioxidant omitted (Examples 31 to 34).

What is claimed is:

1. A stabilizer comprising at least one member selected from the group consisting of compound 1, compound 2 and compound 3, each of which is defined below:

compound 1: a substituted cyclohexene compound of a hindered piperidine type wherein the 1- and 2-positions on a cyclohexene ring are doubly bonded, a carbon atom situated at the 4-position and/or the 5-position of the cyclohexene ring contains a substituent having a C=O group at its alpha-position, at least one carbon atom of the cyclohexene ring located adjacent to said carbon atom having the C=O group has a hydrogen atom as a substituent, and at least one group containing a 2,2,6,6-tetramethyl-4-piperidyl group, which is substituted at its 1-position with a hydrogen atom an alkyl group of 1 to 5 carbon atoms or an acyl group of 1 to 5 carbon atoms, is attached to the 3-, 4-, 5- or 6-position of the cyclohexene ring;

compound 2: a substituted cyclohexane compound of a hindered piperidine type represented by Formula (I)

where $R_1$ is a hydrocarbon group, X is a divalent hydrocarbon group, $Y_1$ and $Y_2$ are each a hydrogen atom or a $COR_4$ group, $R_2$ and $R_3$ are each a hydrogen atom or a hydrocarbon group, wherein $R_4$ is represented by Formula (II)

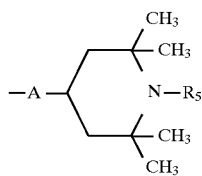

where A is —O— or —NR$_6$— wherein R$_6$ is a hydrogen atom, or an alkyl or acyl group of 1 to 5 in carbon number, R$_5$ is a hydrogen atom, or an alkyl or acyl group of 1 to 5 in carbon number, R$_2$ and R$_3$ are each a hydrogen atom when Y$_1$ and Y$_2$ are each a COR$_4$ group, R$_2$ is a hydrogen atom when Y$_1$ is a COR$_4$ group, R$_3$ is a hydrogen atom when Y$_2$ is a COR$_4$ group, and at least one of Y$_1$ and Y$_2$ is a COR$_4$ group; and compound 3: a compound of a hindered piperidine type represented by Formula (III)

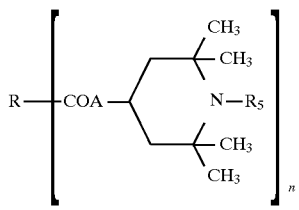

where R is a moiety of a dimer, trimer or tetramer of unsaturated fatty acids of 16 to 22 in carbon number, or a moiety of a hydrogenated product thereof, n is an integer from 2 to 4, A is —O— or —NR$_6$— wherein R$_6$ is a hydrogen atom, or an alkyl or acyl group of 1 to 5 in carbon number, and R$_5$ is a hydrogen atom, or an alkyl or acyl group of 1 to 5 in carbon number.

2. A stabilizer comprising a compound represented by Formula (IV)

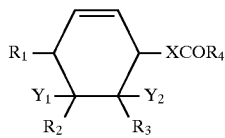

where R$_1$ is a hydrocarbon group, X is a divalent hydrocarbon group, Y$_1$ and Y$_2$ are each a hydrogen atom or a COR$_4$ group, R$_2$ and R$_3$ are each a hydrogen atom or a hydrocarbon group, wherein R$_4$ is represented by Formula (V)

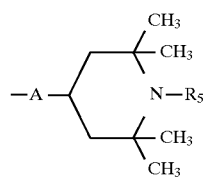

where A is —O— or —NR$_6$— wherein R$_6$ is a hydrogen atom, or an alkyl or acyl group of 1 to 5 in carbon number, and R$_5$ is a hydrogen atom, or an alkyl or acyl group of 1 to 5 in carbon number, R$_2$ and R$_3$ are each a hydrogen atom when Y$_1$ and Y$_2$ are each a COR$_4$ group, R$_2$ is a hydrogen atom when Y$_1$ is a COR$_4$ group, R$_3$ is a hydrogen atom when Y$_2$ is a COR$_4$ group, and at least one of Y$_1$ and Y$_2$ is a COR$_4$ group.

3. The stabilizer according to claim 2, wherein said stabilizer is a compound represented by Formula (IV')

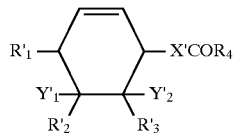

where R'$_1$ is an alkyl or alkenyl group of 1 to 16 in carbon number, X' is an alkylene or alkenylene group of 1 to 16 in carbon number, Y'$_1$ and Y'$_2$ are each a hydrogen atom or a COR$_4$ group wherein at least one of Y'$_1$ and Y'$_2$ is a COR$_4$ group, and R'$_2$ and R'$_3$ are each a hydrogen atom, or an alkyl group of 1 to 5 in carbon number, an alkenyl group of 2 to 5 in carbon number or an aryl group of 6 to 8 in carbon number, wherein R$_4$ is represented by Formula (V)

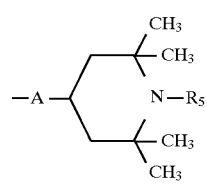

where A is —O— or —NR$_6$— wherein R$_6$ is a hydrogen atom, or an alkyl or acyl group of 1 to 5 in carbon atom, and R$_5$ is a hydrogen atom, or an alkyl or acyl group of 1 to 5 in carbon number.

4. The stabilizer according to claim 2 or 3, wherein R$_5$ present in Formula (V) is a hydrogen atom or a methyl group.

5. The stabilizer according to claim 1, wherein said at least one member is compound 2 and is a compound represented by Formula (I')

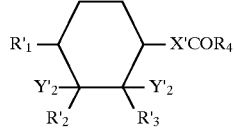

where R'$_1$ is an alkyl or alkenyl group of 1 to 16 in carbon number, X' is an alkylene or alkenylene group of 1 to 16 in carbon number, Y'$_1$ and Y'$_2$ are each a hydrogen atom or a COR$_4$ group wherein at least one of Y'$_1$ and Y'$_2$ is a COR$_4$ group, and R'$_2$ and R'$_3$ are each a hydrogen atom, or an alkyl group of 1 to 5 in carbon number, an alkenyl group of 2 to 5 in carbon number or an aryl group of 6 to 8 in carbon number, wherein R$_4$ is represented by Formula (II)

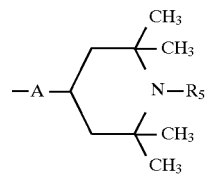

where A is —O— or —NR$_6$— wherein R$_6$ is a hydrogen atom, or an alkyl or acyl group of 1 to 5 in carbon number, and R$_5$ is a hydrogen atom, or an alkyl or acyl group of 1 to 5 in carbon number.

6. The stabilizer according to claim 1 or 5, wherein R$_5$ present in Formula (II) is a hydrogen atom or a methyl group.

7. The stabilizer according to claim 1, wherein R$_5$ present in Formula (III) is a hydrogen atom or a methyl group.

8. A stabilized resin composition comprising 100 parts by weight of a starting resin and 0.01 to 1 part by weight of the stabilizer of claim 1.

9. The composition according to claim 8, wherein the starting resin is a thermoplastic resin.

10. The composition according to claim 8, wherein compound 1 is the stabilizer and is a compound represented by Formula (IV)

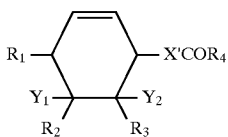

where $R_1$ is a hydrocarbon group, X is a divalent hydrocarbon group, $Y_1$ and $Y_2$ are each a hydrogen atom or a $COR_4$ group, $R_2$ and $R_3$ are each a hydrogen atom or a hydrogen group, wherein $R_4$ is represented by Formula (V)

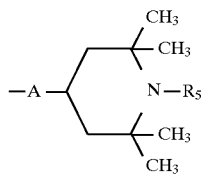

where A is —O— or —$NR_6$— wherein $R_6$ is a hydrogen atom, or an alkyl or acyl group of 1 to 5 in carbon number, and $R_5$ is a hydrogen atom, or an alkyl or acyl group of 1 to 5 in carbon number, $R_2$ and $R_3$ are each a hydrogen atom when $Y_1$ and $Y_2$ are each a $COR_4$ group, $R_2$ is a hydrogen atom when $Y_1$ is a $COR_4$ group, $R_3$ is a hydrogen atom when $Y_2$ is a $COR_4$ group, and at least one of $Y_1$ and $Y_2$ is a $COR_4$ group.

11. The composition according to claim 8, wherein compound 1 is the stabilizer and is a compound represented by Formula (IV')

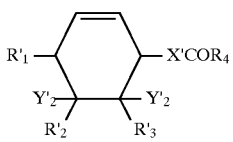

where $R'_1$ is an alkyl or alkenyl group of 1 to 16 in carbon number, X' is an alkylene or alkenylene group of 1 to 16 in carbon number, $Y'_1$ and $Y'_2$ are each a hydrogen atom or a $COR_4$ group at least one of $Y'_1$ and $Y'_2$ is a $COR_4$ group, and $R'_2$ and $R'_3$ are each a hydrogen atom, or an alkyl group of 1 to 5 in carbon number, an alkenyl group of 2 to 5 in carbon number or an aryl group of 6 to 8 in carbon number, wherein $R_4$ is represented by Formula (V)

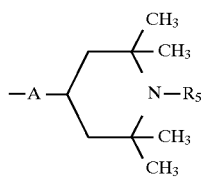

where A is —O— or —$NR_6$— wherein $R_6$ is a hydrogen atom, or an alkyl or acyl group of 1 to 5 in carbon atom, and $R_5$ is a hydrogen atom, or an alkyl or acyl group of 1 to 5 in carbon number.

12. The composition according to claim 10 or 11, wherein $R_5$ present in Formula (V) is a hydrogen atom or a methyl group.

13. The composition according to claim 8, wherein compound 2 is the stabilizer and is a compound represented by Formula (I')

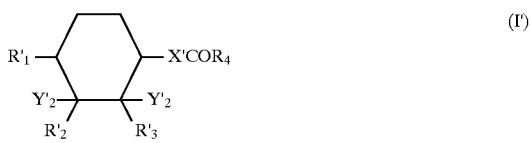

where $R'_1$ is an alkyl or alkenyl group of 1 to 16 in carbon number, X' is an alkylene or alkenylene group of 1 to 16 in carbon number, $Y'_1$ and $Y'_2$ are each a hydrogen atom or a $COR_4$ group wherein at least one of $Y'_1$ and $Y'_2$ is a $COR_4$ group, and $R'_2$ and $R'_3$ are each a hydrogen atom, or an alkyl group of 1 to 5 in carbon number, an alkenyl group of 2 to 5 in carbon number or an aryl group of 6 to 8 in carbon number, wherein $R_4$ is represented by Formula (II)

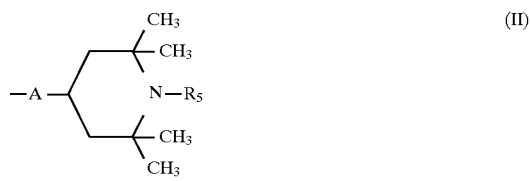

where A is —O— or —$NR_6$— wherein $R_6$ is a hydrogen atom, or an alkyl or acyl group of 1 to 5 in carbon number, and $R_5$ is a hydrogen atom, or an alkyl or acyl group of 1 to 5 in carbon number.

14. The composition according to claim 13, wherein $R_5$ present in Formula (II) is a hydrogen atom or a methyl group.

15. The composition according to claim 8, wherein $R_5$ present in Formula (III) taken to represent compound 3 as the stabilizer is a hydrogen atom or a methyl group.

16. A stabilizer as set forth in claim 2 wherein X is $(CH_2)_7$.

17. A stabilizer as set forth in claim 5 wherein X' is $(CH_2)_7$.

* * * * *